(12) United States Patent
Moscovich et al.

(10) Patent No.: US 10,656,763 B1
(45) Date of Patent: May 19, 2020

(54) DYNAMIC ADJUSTMENT OF A CLICK THRESHOLD CORRESPONDING TO A FORCE-BASED TACTILE SENSOR

(71) Applicant: Sensel, Inc., Mountain View, CA (US)

(72) Inventors: Tomer Moscovich, San Francisco, CA (US); Ilya Daniel Rosenberg, Mountain View, CA (US)

(73) Assignee: SENSEL, INC., Mountain View, CA (US)

( * ) Notice: Subject to any disclaimer, the term of this patent is extended or adjusted under 35 U.S.C. 154(b) by 0 days.

(21) Appl. No.: 16/240,625

(22) Filed: Jan. 4, 2019

(51) Int. Cl.
*G06F 3/041* (2006.01)
*G06F 3/044* (2006.01)
*G06F 3/0488* (2013.01)
*G06F 3/042* (2006.01)

(52) U.S. Cl.
CPC ........ *G06F 3/04186* (2019.05); *G06F 3/0446* (2019.05); *G06F 3/0488* (2013.01); *G06F 3/042* (2013.01); *G06F 2203/04102* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 8,798,956 B2* | 8/2014 | Leung | ...................... | G01L 5/165 702/141 |
| 9,110,561 B2* | 8/2015 | Moore | ................... | G06F 3/0481 |
| 9,262,002 B2* | 2/2016 | Momeyer | ............. | G06F 3/0414 |
| 9,542,016 B2* | 1/2017 | Armstrong-Muntner | ..................... | G06F 3/042 |
| 9,785,272 B1* | 10/2017 | Rosenberg | ............ | G06F 3/0414 |
| 10,042,599 B2* | 8/2018 | Clarke | .................... | G06F 3/033 |

(Continued)

FOREIGN PATENT DOCUMENTS

WO   WO-2018129149 A1 *  7/2018  ............. H01H 13/85

OTHER PUBLICATIONS

Fitzpatrick, Jason. "How to Stop Accidental Trackpad Clicks in Windows 10 (And Other Mouse Enhancements)" How-To-Geek, Jul. 23, 2015. [https://www.howtogeek.com/223404/how-to-stop-accidental-trackpad-clicks-in-windows-10-and-other-mouse-enhancements/], retrieved Apr. 19, 2018, 6 pages.

(Continued)

*Primary Examiner* — Patrick F Marinelli
(74) *Attorney, Agent, or Firm* — Amin, Turocy & Watson, LLP

(57) ABSTRACT

Facilitating dynamic adjustment of a click/unclick threshold corresponding to a force-based tactile sensor is presented herein. A system can comprise a tactile sensor comprising force-based sensor(s); and a motion detection component that can determine a rate of change of a movement that has been detected via a group of sensors comprising the force-based sensor(s), and based on the rate of change of the movement, modify a defined sensitivity of the force-based sensor(s) with respect to detection of a click and/or unclick event corresponding to the tactile sensor. Further, the motion detection component can decrease the defined sensitivity with respect to detection of the click and/or unclick event in response to the rate of change being determined to satisfy a defined condition representing an increase in the speed at which the stylus or the finger has moved across the tactile sensor.

20 Claims, 17 Drawing Sheets

(56) References Cited

U.S. PATENT DOCUMENTS

| | | | | |
|---|---|---|---|---|
| 10,055,048 | B2* | 8/2018 | Smith | G06F 3/0416 |
| 10,180,755 | B2* | 1/2019 | Hill | G06F 3/0418 |
| 10,191,638 | B2* | 1/2019 | Hinkel | G06F 3/04847 |
| 10,222,889 | B2* | 3/2019 | Picciotto | G06F 3/0488 |
| 2008/0205714 | A1* | 8/2008 | Benkley | G06F 3/03547 |
| | | | | 382/126 |
| 2011/0187651 | A1* | 8/2011 | Whitlow | G06F 3/041 |
| | | | | 345/173 |
| 2012/0105358 | A1* | 5/2012 | Momeyer | G06F 3/0414 |
| | | | | 345/174 |
| 2014/0071050 | A1* | 3/2014 | Armstrong-Muntner | |
| | | | | G06F 3/03547 |
| | | | | 345/158 |
| 2014/0232677 | A1* | 8/2014 | Yamane | G06F 3/041 |
| | | | | 345/173 |
| 2015/0033163 | A1* | 1/2015 | Hinkel | G06F 3/04847 |
| | | | | 715/765 |
| 2015/0046884 | A1* | 2/2015 | Moore | G06F 3/0481 |
| | | | | 715/863 |
| 2015/0268786 | A1* | 9/2015 | Kitada | G06F 3/0414 |
| | | | | 345/173 |
| 2016/0357297 | A1* | 12/2016 | Picciotto | G06F 3/0488 |
| 2017/0031495 | A1* | 2/2017 | Smith | G06F 3/0416 |
| 2017/0115757 | A1* | 4/2017 | Armstrong-Muntner | |
| | | | | G06F 3/03547 |
| 2017/0123622 | A1* | 5/2017 | Koenders | G06F 3/0414 |
| 2017/0249048 | A1* | 8/2017 | Hill | G06F 3/0418 |
| 2017/0277498 | A1* | 9/2017 | Wood, Jr. | G06F 3/1423 |
| 2017/0285843 | A1* | 10/2017 | Roberts-Hoffman | |
| | | | | G06F 3/016 |
| 2018/0081461 | A1* | 3/2018 | Funahashi | G06F 3/041 |
| 2018/0203562 | A1* | 7/2018 | An | G06F 1/3234 |
| 2018/0299996 | A1* | 10/2018 | Kugler | G06F 3/045 |
| 2018/0300004 | A1* | 10/2018 | Kugler | G06F 3/0414 |
| 2019/0034075 | A1* | 1/2019 | Smochko | G06F 3/04883 |

OTHER PUBLICATIONS

International Search Report and Written Opinion dated Feb. 7, 2020 for PCT Application No. PCT/US2020/012221, 16 pages.

* cited by examiner

DYNAMIC ADJUSTMENT OF A CLICK THRESHOLD CORRESPONDING TO A FORCE-BASED TACTILE SENSOR

TECHNICAL FIELD

The subject disclosure generally relates to embodiments for facilitating dynamic adjustment of a click threshold corresponding to a force-based tactile sensor.

BACKGROUND

People are not very good at maintaining a specific pressing force while operating a touchpad. Moreover, conventional force-sensing touchpads can have variability in performing force measurements across a corresponding sensor surface and/or over time. Accordingly, conventional touch-based sensing technologies utilize high click thresholds to avoid detecting accidental clicks—resulting in excessive force being applied to a pointing device in order to register a click, or selection event. In this regard, conventional sensing technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
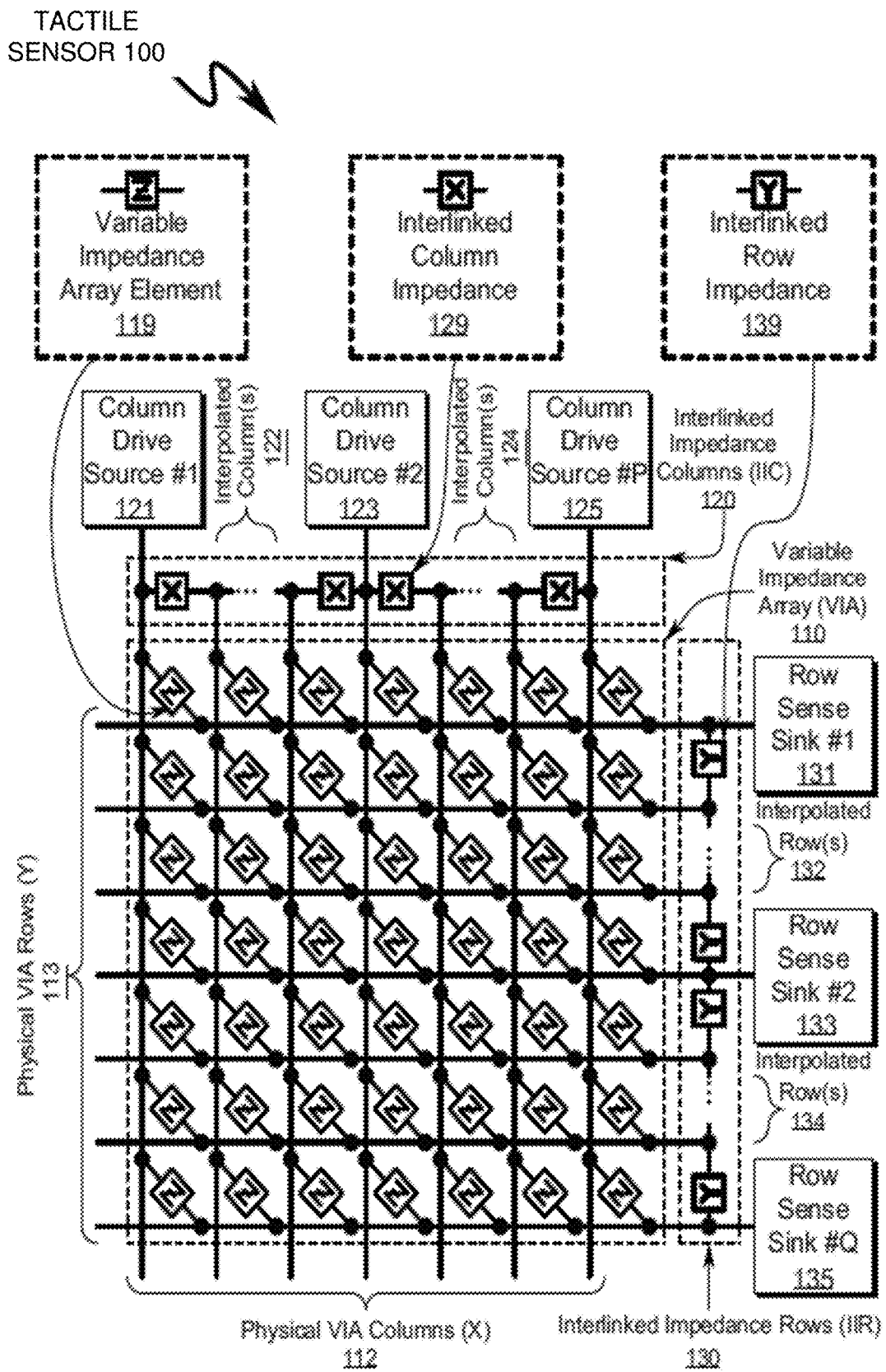
FIG. 1 illustrates a block diagram of a tactile sensor, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional touch-based sensing technologies have had some drawbacks with respect to performing force measurements. Further, such technologies utilize significantly higher click thresholds to avoid detection of accidental clicks—resulting in excessive force being applied by users in order to register a click/selection event.

On the other hand, various embodiments disclosed herein can reduce detection of accidental clicks/unclicks by dynamically adjusting a click/unclick threshold based on a determined motion of a finger, stylus, etc. For example, a system, e.g., tablet, tablet computer, personal digital assistant (PDA), laptop computer, appliance, vehicle control system, etc. can comprise a pointing device, e.g., touchpad, trackpad, touch screen, etc. comprising a tactile sensor comprising force-based sensors, e.g., a variable impedance array (VIA) comprising variable impedance elements that interconnect with respective row and column cross points of the VIA.

In other embodiment(s), the tactile sensor can comprise capacitive-based sensors, an array of capacitive-based sensors, etc. and force-based sensors embedded within, above, below, etc. the capacitive-based sensors. In yet other embodiment(s), the tactile sensor can comprise optical-based sensors, an array of optical-based sensors, etc. and force-based sensors embedded within, above, below, etc. the optical-based sensors.

Further, the system can comprise a motion detection component that is configured to determine a rate of change of a movement that has been detected via the force-based sensors, the capacitive-based sensors, the optical-based sensors, etc. In turn, based on the rate of change of the movement, modify a defined sensitivity of the force-based sensors with respect to detecting a click event, and/or an unclick event, corresponding to the tactile sensor.

In an embodiment, the movement represents a portion of the force-based sensors being contacted by a finger or a stylus, and the click or unclick event represents the movement being determined to satisfy a defined condition with respect to a force property of the movement and/or an area property of the movement.

In this regard, in embodiment(s), the click/unclick event represents the movement has been determined to satisfy the defined condition with respect to the force property based on a magnitude of a force that has been determined to be applied to the force-based sensors, e.g., the click event representing that the magnitude of the force has been determined to be greater than or equal to a defined click magnitude of force, click force threshold, etc.; and the unclick event representing that that magnitude of the force has been determined be less than or equal to a defined unclick magnitude of force, unclick force threshold, etc. In embodiment(s), the click force threshold is greater than the unclick force threshold, e.g., based on a defined magnitude, separation, etc. to facilitate unintentional back-to-back click-unclick-click, etc. events from being detected.

In other embodiment(s), the click/unclick event represents the movement has been determined to satisfy the defined condition with respect to the force property based on a velocity of the force, threshold velocity of the force, change in force over time (e.g., df/dt), etc., e.g., representing that the velocity of the force has been determined to be greater than or equal to a defined velocity, velocity threshold, etc.

In yet other embodiment(s), the click/unclick event represents the movement has been determined to satisfy the defined condition with respect to the area property based on a defined gesture recognition score of a gesture that has been determined to have been detected, e.g., based on a defined profile of the change in the force over time representing the click/unclick event.

In embodiment(s), the click/unclick event represents the movement has been determined to satisfy the defined condition with respect to the area property based on a defined weight being applied to the defined gesture recognition score with respect to a percentage of area of the tactile sensor that has been determined to be contacted by the finger, e.g., the defined weight being increased in response to a greater percentage of area of the tactile sensor being determined to be contacted by the finger.

In other embodiment(s), the click/unclick event represents the movement has been determined to satisfy the defined condition with respect to the area property based on the defined weight being applied to the defined gesture recognition score according to a location of the tactile sensor that has been determined to be contacted by the finger, e.g., the defined weight being increased in response to a defined location of the tactile sensor being determined to be contacted by the finger.

In one embodiment, the motion detection component can decrease the defined sensitivity (e.g., increase a magnitude of a click detection, force, etc. threshold) with respect to the detection of the click event in response to the rate of change of the movement being determined to satisfy a defined condition representing an increase in a speed at which the stylus or the finger has moved across the tactile sensor, e.g., to facilitate a reduction in accidental detection of the click event when the stylus or the finger is moving greater than a defined speed. Further, the motion detection component can increase the defined sensitivity (e.g., decrease the magnitude of the click detection, force, etc. threshold) with respect to the detection of the click event in response to the rate of change of the movement being determined to satisfy another defined condition representing a decrease in the speed, e.g., to facilitate an increased detection of the click event when the stylus or the finger is moving less than or equal to the defined speed.

In another embodiment, the motion detection component can decrease the defined sensitivity (e.g., increase a magnitude of an unclick detection, force, etc. threshold) with respect to the detection of the unclick event in response to the rate of change of the movement being determined to satisfy the defined condition representing the increase in the speed at which the stylus or the finger has moved across the tactile sensor—to facilitate a reduction in detection of accidental lift(s), unclick(s), etc. Further, the motion detection component can increase the defined sensitivity (e.g., decrease the magnitude of the unclick detection, force, etc. threshold) with respect to the detection of the unclick event in response to the rate of change of the movement being determined to satisfy the other defined condition representing the decrease in the speed—to facilitate increased detection of the unclick event when the stylus or the finger is moving less than or equal to the defined speed.

In other embodiment(s), the motion detection component can further be configured to modify the defined sensitivity with respect to detecting the click/unlick event based on a determined: force corresponding to the movement; area of a contact of the tactile sensor corresponding to the movement; shape of the determined area of the contact; change in the determined force; change in the determined area; change in the determined force relative to a determined change in position of the contact; time since a last click/unclick event has been detected; time since a last swipe of the tactile sensor has occurred; hover path of a finger, stylus, etc.; motion of the finger, stylus, etc.; position of the finger, stylus, etc. on the tactile sensor; number of touches and/or contacts of the tactile sensor; gesture corresponding to the movement; location of the determined area of the contact; and/or probability of the click event that has been determined based on the determined force, the determined area of the contact, the determined shape, the determined change in the determined force, the determined change in the determined area of the contact, the determined time since the last click event has been detected, the determined time since the last swipe of the tactile sensor has occurred, a distance from the last click/unclick, the determined hover path of the finger, stylus, etc., a drag state of the finger, stylus, etc., the determined motion of the finger, stylus, etc., the determined position of the finger, stylus, etc., the determined number of the touches of the tactile sensor, the determined number of the contacts of the tactile sensor, the determined gesture, and/or the determined location of the determined area of the contact.

In one embodiment, a method can comprise determining, by a system comprising a processor via a group of sensors comprising force-based sensor(s), a speed, rate of change, etc. of a motion of a finger and/or a stylus that has contacted a tactile sensor comprising the group of sensors; and modifying, by the system based on the speed, a defined sensitivity of the force-based sensor(s) with respect to detecting a click input and/or an unclick input.

In an embodiment, the modifying comprises decreasing the defined sensitivity of the force-based sensor(s) with respect to the detecting the click input to facilitate a reduction in detection of accidental click inputs in response to determining that the speed of the motion has increased.

In another embodiment, the modifying comprises increasing the defined sensitivity of the force-based sensor(s) with respect to the detecting the click input to facilitate an increase in detection of click inputs in response to determining that the speed of the motion has decreased.

In yet another embodiment, the modifying comprises decreasing the defined sensitivity of the force-based sensor(s) with respect to detecting the unclick input to facilitate a reduction in detection of accidental lifts of the finger or the stylus from the tactile sensor in response to determining that the speed of the motion has increased.

In one embodiment, the modifying comprises increasing the defined sensitivity of the force-based sensor(s) with respect to the detecting the unclick input to facilitate an increase in detection of lifts of the finger or the stylus from the tactile sensor in response to determining that the speed of the motion has decreased.

In an embodiment, a device, e.g., trackpad, computing device, portable communication device, etc. comprises a group of sensors comprising a force-based sensor; and a motion detection component that determines, using at least a portion of the group of sensors, a speed of a motion of at least one of a finger or a stylus that has contacted the portion of the group of sensors; and modifies, based on the speed of the motion, a defined sensitivity of the force-based sensor with respect to detection of a click input or an unclick input.

In embodiment(s), the motion detection component detects the click input or the unclick input based on: a defined magnitude of a force that has been determined to be applied to a portion of the group of sensors; a defined velocity of the force; a defined gesture recognition score of a gesture that has been determined to have been detected; a defined percentage of area of the portion of the group of sensors that has been determined to be contacted by a finger; and/or a defined location of the portion of the group of sensors that has been determined to be contacted by the finger.

As described above, conventional touch-based sensing technologies utilize high click thresholds to avoid registering accidental clicks—requiring excessive force to be applied to a pointing device to register a click/selection event. On the other hand, various embodiments described herein can improve user experience(s), e.g., enabling smoother, less finicky operation of a touchpad during faster finger, stylus, etc. motions, by dynamically adjusting click and lift/unclick thresholds based on a determined motion of the finger, stylus, etc.; based on a determined likelihood of an intentional click/unclick, etc.

Figure 2:
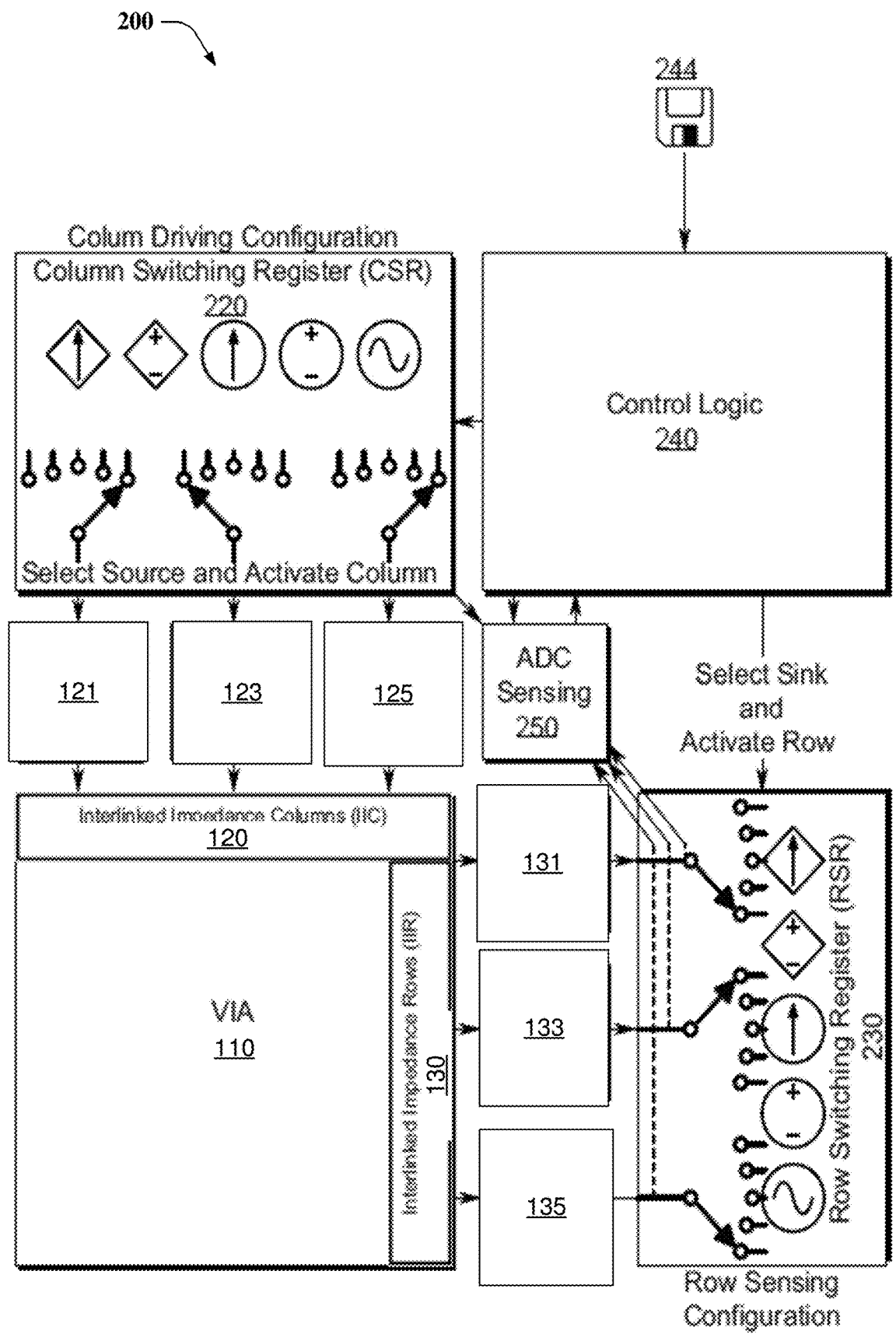
FIG. 2 illustrates a block diagram of a system comprising control logic and corresponding switching registers for controlling a tactile sensor, in accordance with various example embodiments.
Figure 3:
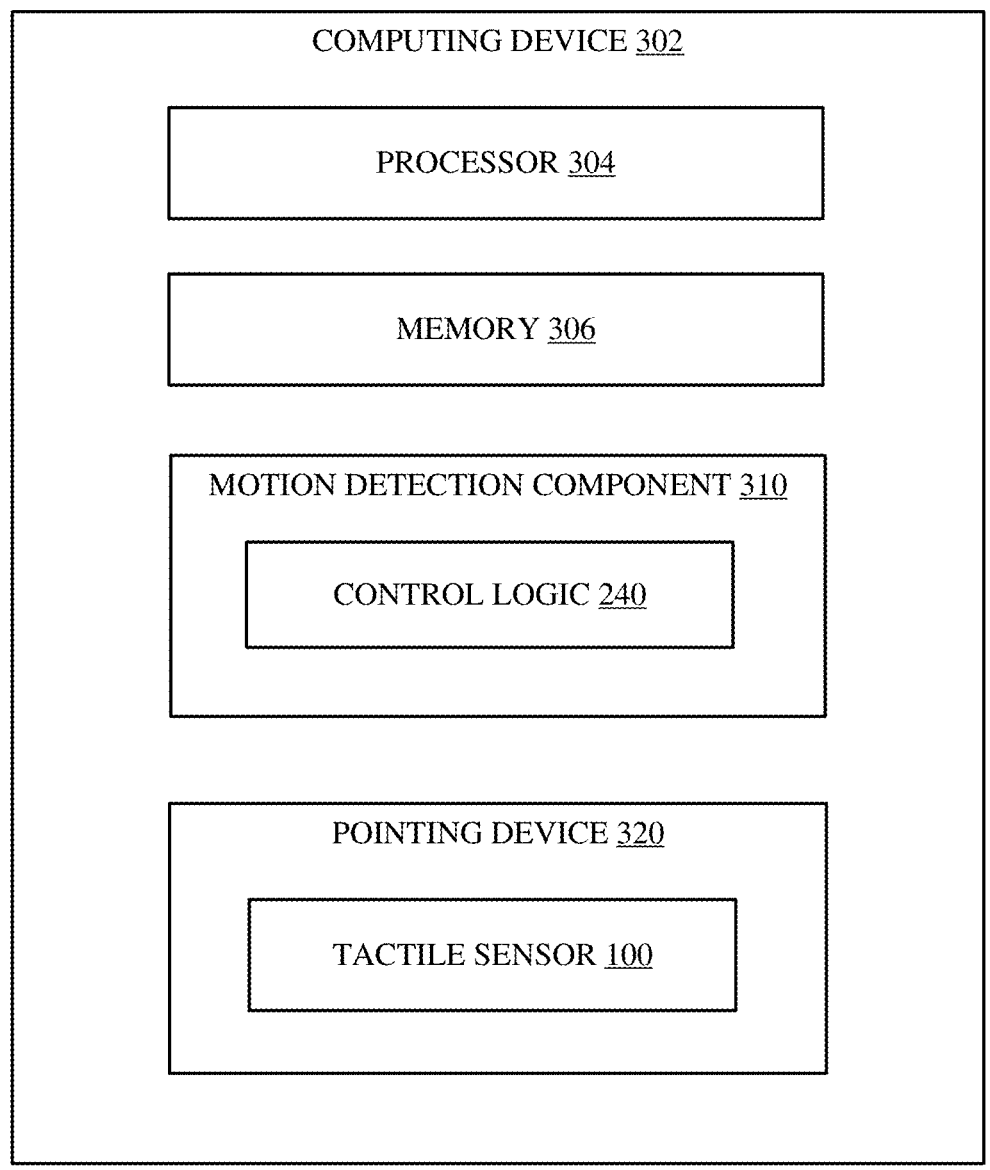
FIG. 3 illustrates a block diagram of a computing device comprising a motion detection component that dynamically adjusts a click/unclick threshold of a tactile sensor, in accordance with various example embodiments.

Referring now to FIGS. 1-3, block diagrams of a tactile sensor (100), a system (200) comprising control logic (240) and corresponding switching registers (230, 230) for controlling a tactile sensor (e.g., comprising variable impedance array (VIA) 110), and a computing device (302) comprising a motion detection component (310) that dynamically adjusts a click/unclick threshold of the tactile sensor are illustrated, respectively, in accordance with various example embodiments.

In this regard, VIA sensors corresponding to embodiment(s) disclosed herein are described in the following applications, the disclosures of which are hereby incorporated by reference in their entirety: U.S. patent application Ser. No. 15/599,365 titled SYSTEM FOR DETECTING AND CONFIRMING A TOUCH INPUT and filed on May 18, 2017; U.S. patent application Ser. No. 15/653,856 titled TOUCH SENSOR DETECTOR SYSTEM AND METHOD and filed on Jul. 19, 2017; U.S. patent application Ser. No. 15/271,953 (now U.S. Pat. No. 9,746,964) titled DIAMOND PATTERNED TOUCH SENSOR SYSTEM AND METHOD and filed on Sep. 21, 2016; U.S. patent application Ser. No. 14/499,090 (now U.S. Pat. No. 9,459,746) titled CAPACITIVE TOUCH SENSOR SYSTEM AND METHOD and filed on Sep. 27, 2014; U.S. patent application Ser. No. 14/499,001 (now U.S. Pat. No. 9,465,477) titled RESISTIVE TOUCH SENSOR SYSTEM AND METHOD and filed on Sep. 26, 2014; U.S. patent application Ser. No. 15/224,003 (now U.S. Pat. No. 9,864,461) titled SYSTEMS AND METHODS FOR MANIPULATING A VIRTUAL ENVIRONMENT and filed on Jul. 29, 2016; U.S. patent application Ser. No. 15/223,968 (now U.S. Pat. No. 9,864,460) titled SYSTEMS AND METHODS FOR MANIPULATING A VIRTUAL ENVIRONMENT and filed on Jul. 29, 2016; U.S. patent application Ser. No. 15/470,669 titled SYSTEM AND METHOD FOR DETECTING AND CHARACTERIZING FORCE INPUTS ON A SURFACE and filed on Mar. 27, 2017; and U.S. patent application Ser. No. 15/476,732 titled HUMAN-COMPUTER INTERFACE SYSTEM and filed on Oct. 5, 2017.

FIGS. 1-2 illustrate block diagrams of a tactile sensor (100) comprising a VIA (110), and a system (200) comprising control logic (240) and corresponding switching registers (220, 230) for controlling the tactile sensor, respectively, in accordance with various example embodiments. In this regard, the VIA comprises physical VIA columns (112) and physical VIA rows (113), in which individual variable impedance array elements (119) can interconnect within row/column cross points of the VIA. The individual variable impedance array elements (119)—depicted as generalized impedance values Z—can comprise active and/or passive components, and any combination of resistive, capacitive, and/or inductive components, devices, etc.

The physical VIA columns (112) and the physical VIA rows (113) are connected via interlinked impedance columns (IICs) (120) and interlinked impedance rows (IIRs) (130), respectively. The IICs (120) and IIRs (130) are configured to reduce the number of columns and rows that are connected to column drive sources (121, 123, 125) and row sense sinks (131, 133, 135). As such, the combination of the IICs (120) and the IIRs (130) can reduce an amount of external components, e.g., column drive sources, row sense sinks, etc. that are used to drive, connect to, etc. the physical VIA columns (112) and the physical VIA rows (113).

In this regard, in embodiment(s), the IICs (120) can reduce a number of the column drive sources (121, 123, 125) to less than a number of the physical VIA columns (112), and the IIRs (130) can reduce a number of the row sense sinks (131, 133, 135) to less than a number of the physical VIA rows (113). For example, this reduction can be achieved by having one or more interlinked column impedance (ICI) elements (129) between each VIA physical column (112), and one or more interlinked row impedance (IRI) elements (139) between each VIA physical row (113). Thus, an XxY sensor path of the VIA (110) is translated to an electrical interface only requiring P column drivers and Q row sensors. In embodiment(s), constrains $P \leq X$ and $Q \leq Y$ can be satisfied. Further, constraints $X/P \geq 2$ or $Y/Q \geq 2$ can be satisfied in various embodiment(s).

It should be appreciated that in various embodiment(s), an IIC of the IICs (120) can incorporate a plurality of interlinked impedance elements, and an IIR of the IIRs (130) can incorporate a singular interlinked impedance element.

In other embodiment(s), an IIC of the IICs (120) can incorporate a singular interlinked impedance element, and an IIR of the IIRs (130) can incorporate a plurality of interlinked impedance elements.

The ICI elements (129) are configured to connect individual columns of the physical VIA columns (112), and can comprise active and/or passive components, e.g., comprising any combination of resistive, capacitive, and/or inductive components, devices, etc. Thus, the ICI elements (129) are depicted, e.g., generically, in FIG. 1 as generalized impedance values X. In embodiment(s), the individual columns of the physical VIA columns (112) can be directly driven using respective drive sources of the column drive sources (121, 123, 125), or indirectly driven, e.g., via interpolated column(s) (122, 124) that are between directly driven columns of the physical VIA columns (112).

The IRI elements (139) are configured to connect individual rows of the physical VIA rows (113), and can comprises active and/or passive components, e.g., comprising any combination of resistive, capacitive, and/or inductive components, devices, etc. Thus, the IRI elements (139) are depicted, e.g., generically, in FIG. 1 as generalized impedance values Y. In embodiment(s), the individual columns of the physical VIA rows (113) can be directly sensed using respective sense sinks of the row sense sinks (131, 133, 135), or indirectly sensed, e.g., via interpolated row(s) (132, 134) that are between directly sensed rows of the physical VIA rows (113).

In embodiment(s), the column drive sources (121, 123, 125) can be combined utilizing a series of switches controlled by a column switching register (220) that defines a type of column drive source to be electrically coupled to each column that is externally accessible to the VIA (110). In other embodiment(s), variations of AC/DC excitation, voltage sources, open circuits, current sources, and/or other electrical source driver combinations can be used, e.g., as switched configurations, for the column drive sources (121, 123, 125). In this regard, the column switching register (220) can be configured to select a type of electrical source, e.g., of the electrical source driver combinations, to be applied to the VIA (110), and an amplitude/magnitude of the electrical source.

In yet other embodiment(s), the row sense sinks (131, 133, 135) can be combined utilizing a series of switches controlled by a row switching register (230) that defines a type of row sense sink to be electrically coupled to each row that is externally accessible to the VIA (110). In other embodiment(s), variations of AC/DC excitation, voltage sources, open circuits, current sources, and other electrical sense sink combinations can be used, e.g., as switched configurations, for the row sense sinks (131, 133, 135). In this regard, the row switching register (230) can be configured to select a type of electrical sink, e.g., of the sense sink combinations, to be applied to the VIA (110), and an amplitude/magnitude of the electrical sink.

Column switching registers (220) can comprise a set of latches or other memory elements that can configure switches that control a type of drive source associated with each column drive source of the column drive sources (121, 123, 125), an amplitude/magnitude of the drive source, and whether the drive source is activated. Further, row switching registers (230) can comprise a set of latches or other memory elements that can configure switches that control a type of sense sink associated with each row sense sink of the row sense sinks (131, 133, 135), an amplitude/magnitude of a sink, and whether the sink is activated.

In embodiment(s), the IICs (120) and the IIRs (130) can comprise a wide variety of impedances that can be static or actively engaged by respective configurations of the column switching registers (220) and the row switching registers (230), respectively. For example, in embodiment(s), the column switching registers (220) and row switching registers (230) can be configured to not only stimulate/sense the VIA (110), but also configure an interlinked nature of the VIA (110) by reconfiguring column cross-links and row cross-links of the VIA (110).

In this regard, control logic (240) can comprise a processor, microcontroller, computing device, etc. (not shown) that can execute machine executable instructions, e.g., which can be read, via the processor, etc. from a computer-readable medium, e.g., nonvolatile memory 244. Further, the control logic (240) can configure the column switching registers (220) and the row switching registers (230) to stimulate/sense the VIA (110), reconfigure column cross-links and row cross-links of the VIA (110), etc.

For example, in various embodiment(s), the control logic (240) can control respective states of column drive switches (not shown) of the column switching registers (220) and row sink switches (not shown) of the row switching registers (230). In this regard, the column drive switches can control whether respective columns of the VIA (110) are grounded, driven to a voltage potential from a voltage source, e.g., adjustable by the control logic (240) to enable "on-the-fly" adjustment for non-linearities in driving electronics, or electrically coupled to an analog-to-digital (ADC) converter, e.g., ADC sensing 250, to sense the VIA (110). Further, the row sink switches can control whether respective rows of the VIA (110) are grounded, electrically coupled to current sinks, or electrically coupled to the ADC converter, e.g., ADC sensing 250, to sense the VIA (110). Correspondingly, the processor can control, configure, etc. (e.g., via the control logic (240)) the ADC based on configurations of the column switching registers (220), the row switching registers (230), the control logic, etc., e.g., to sense the VIA (110).

Figure 4:
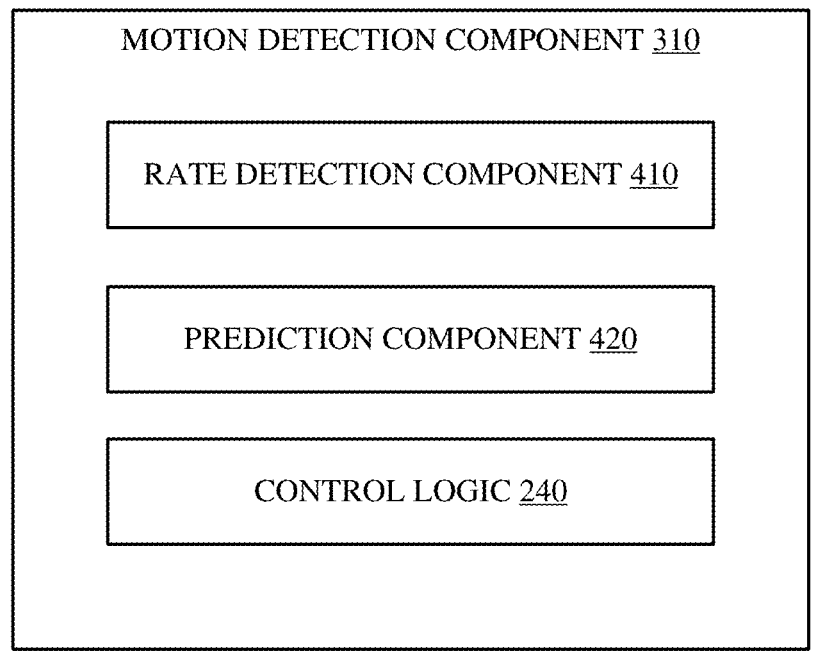
FIG. 4 illustrates a block diagram of a motion detection component, in accordance with various example embodiments.

Referring now to FIGS. 3-4, a computing device (302), e.g., tablet, tablet computer, PDA, laptop computer, appliance, vehicle control system, etc. can comprise a pointing device (320), e.g., touchpad, trackpad, etc. comprising a tactile sensor (100), e.g., comprising force-based sensors, e.g., the VIA (110) comprising variable impedance elements that interconnect with respective row and column cross points of the VIA. Further, the computing device (302) can comprise a motion detection component (310) comprising a rate detection component (410), a prediction component (420), and the control logic (240).

In embodiment(s), the tactile sensor (100) can comprise capacitive-based sensors (not shown), an array of capacitive-based sensors (not shown), etc. and force-based sensor(s) embedded within, above, below, etc. the capacitive-based sensors, the array of capacitive-based sensors, etc. In yet other embodiment(s), the tactile sensor (100) can comprise optical-based sensors (not shown), an array of optical-based sensors (not shown), etc. and force-based sensor(s) embedded within, above, below, etc. the optical-based sensors, the array of optical-based sensors, etc. In turn, the rate detection component (410) can determine a rate of change of a movement that has been detected via the force-based sensor(s), the capacitive-based sensors, the array of capacitive-based sensors, the optical-based sensors, the array of optical-based sensors, etc., e.g., the movement representing a portion of such sensors being touched, contacted, etc. by a finger or a stylus.

Figure 5:
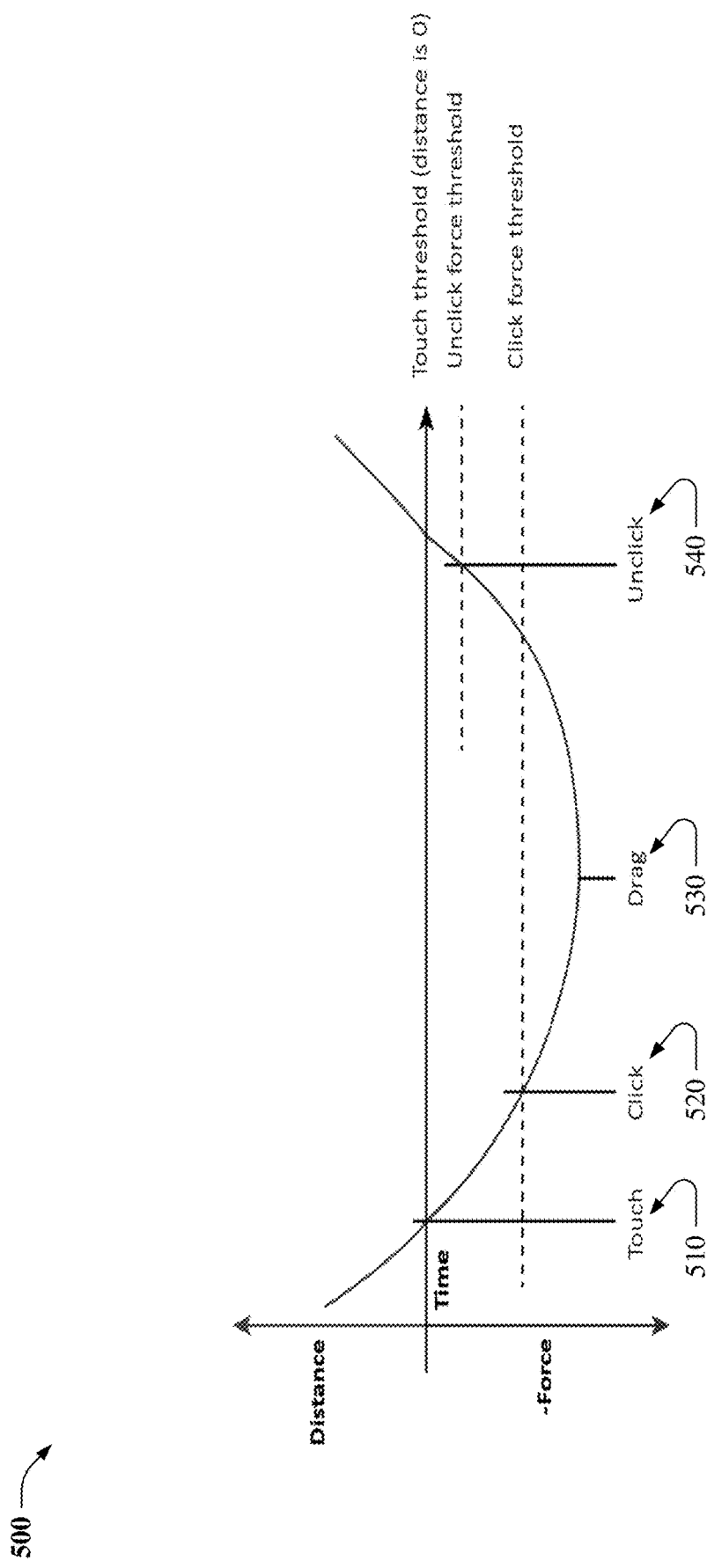
FIG. 5 illustrates empirical data of a drag state of a tactile sensor occurring between click and unclick states of the tactile sensor, in accordance with various example embodiments.

Referring now to FIG. 5, empirical data of states of the motion detection component (310) corresponding to respective determined events, over time, is illustrated, in accordance with various example embodiments. In this regard, the motion detection component (310) can detect, using sensor(s) of the tactile sensor (100), that a portion of the tactile sensor (100) has been touched, contacted, etc. by the finger or the stylus, and enter a touch state (510).

In turn, the motion detection component (310) can determine whether the movement of the finger or the stylus satisfies a defined condition with respect to a force property and/or an area property representing a click state (520), a click event, etc. In this regard, in embodiment(s), the click event can initiate the computing device (302) to perform an action, e.g., launch an application, select an object corresponding to the application, enter an interaction mode, provide feedback (e.g., visual, haptic, audible, etc.) to a user of the computing device (302), etc. In an embodiment illustrated by FIG. 5, the defined condition with respect to the force property can comprise a defined magnitude, e.g., click force threshold, and the motion detection component (310) can enter the click state (520) in response to a determination that a magnitude of a force that has been applied to the force-based sensor(s) is greater than or equal to the click force threshold.

In another embodiment (not shown), the defined condition with respect to the force property can comprise a defined velocity of the force, and the motion detection component (310) can enter the click state (520) in response to a determination that a determined velocity of the force is greater than or equal to the defined velocity of the force.

In yet another embodiment (not shown), the defined condition with respect to the area property can comprise a defined gesture recognition score, and the motion detection component (310) can enter the click state (520) in response to a determination that a determined gesture recognition score of a gesture that has been detected, e.g., based on a defined profile of the change in the force over time representing the gesture, is greater than or equal to the defined gesture recognition score.

In one embodiment (not shown), the defined condition with respect to the area property can be based on a defined weight being applied to the defined gesture recognition score with respect to a percentage of area of the tactile sensor (100) that has been determined to be contacted by the finger, e.g., the defined weight being increased, and consequently the defined gesture recognition score being increased, in response to a greater percentage of area of the tactile sensor (100) being determined to be contacted by the finger.

In other embodiment(s) (not shown), the defined condition with respect to the area property can be based on the defined weight being applied to the defined gesture recognition score with respect to a location of the tactile sensor (100) that has been determined to be contacted by the finger, e.g., the defined weight being increased in response to a defined location, e.g., location of a display button, particular area, etc. of the tactile sensor (100) being determined to be contacted by the finger.

Returning now to FIG. 5, the motion detection component (310) can determine, while in the click state (520), whether the finger or the stylus is being dragged, or moved, across a surface of the tactile sensor (100) greater than or equal to a defined x/y distance, e.g., number of pixels. In this regard, in response to the finger or the stylus being determined to be dragged greater than or equal to the defined x/y distance, e.g., 1 pixel, the motion detection component (310) can enter a drag state (530). In embodiment(s), entry into the drag state (530) can initiate the computing device (302) to provide feedback (e.g., visual, haptic, audible, etc.) to the user of the computing device (302).

In turn, the motion detection component (310) can determine, while in the drag state (530), whether the movement of the finger or the stylus satisfies a defined condition with respect to a force property and/or an area property representing an unclick state (540), an unclick event, etc. In this regard, in embodiment(s), the unclick event can initiate the computing device (302) to perform an action, e.g., close the application, de-select the object corresponding to the application, exit the interaction mode, provide feedback (e.g., visual, haptic, audible, etc.) to the user, etc.

In an embodiment illustrated by FIG. 5, the defined condition with respect to the force property representing the unclick event can comprise a defined magnitude, e.g., unclick force threshold, and the motion detection component (310) can enter the unclick state (540) in response to a determination that a magnitude of a force that has been applied to the force-based sensor(s) is less than or equal to the unclick force threshold.

In another embodiment (not shown), the defined condition with respect to the force property representing the unclick event can comprise a defined velocity of the force representing the unclick event, and the motion detection component (310) can enter the unclick state (540) in response to a determination, e.g., while in the drag state (530), that a determined velocity of the force is less than or equal to the defined velocity of the force representing the unclick event.

In yet another embodiment (not shown), the defined condition with respect to the area property representing the unclick event can comprise a defined gesture recognition score of a gesture that has been determined to have been detected, e.g., based on a defined profile of the change in the force over time representing the unclick event.

In one embodiment (not shown), the defined condition with respect to the area property representing the unclick event can be based on a defined weight being applied to the defined gesture recognition score with respect to a percentage of area of the tactile sensor (100) that has been determined to be contacted by the finger, e.g., the defined weight being increased in response to a greater percentage of area of the tactile sensor (100) being determined to be contacted by the finger.

In other embodiment(s) (not shown), the defined condition with respect to the area property representing the unclick event can be based on the defined weight being applied to the defined gesture recognition score with respect to a location of the tactile sensor (100) that has been determined to be contacted by the finger, e.g., the defined weight being increased in response to a defined location of the tactile sensor (100) being determined to be contacted by the finger.

Returning now to FIG. 4, based on the rate of change of the movement that has been detected via the force-based sensor(s), the capacitive-based sensors, the array of capacitive-based sensors, the optical-based sensors, the array of optical-based sensors, etc., the motion detection component (310) can modify a defined sensitivity of the force-based sensor(s) with respect to detecting a click/unclick event corresponding to the tactile sensor (100).

In this regard, in embodiment(s), the motion detection component (310) can decrease the defined sensitivity, e.g., increase a magnitude of the click force threshold, with respect to detecting the click event in response to the rate of change being determined to satisfy a first defined condition representing an increase in the speed at which the finger or the stylus has moved across the tactile sensor (100), e.g., to facilitate a reduction in detection of accidental click(s) when the finger or the stylus has been determined to move quickly, e.g., greater than or equal to a defined speed, e.g., increasing the click force threshold by about 50% in response to a speed of the finger or the stylus being determined to be greater than 25 mm/sec±5 mm/sec.

In other embodiment(s), the motion detection component (310) can increase the defined sensitivity with respect to detecting the click event in response to the rate of change being determined to satisfy a second defined condition representing a decrease in the speed at which the finger or the stylus has moved across the tactile sensor (100) e.g., when the finger or the stylus has been determined to move slowly, e.g., less than the defined speed, e.g., decreasing the magnitude of the click force threshold by about 50% in response to the speed being determined to be less than 20 mm/sec.

Regarding detection of lift/unclick events, in embodiment(s), the motion detection component (310) can decrease the defined sensitivity, e.g., increase a magnitude of an unclick detection threshold, with respect to the detection of the unclick event in response to the rate of change of the movement being determined to satisfy the defined condition representing the increase in the speed at which the stylus or the finger has moved across the tactile sensor—to facilitate a reduction in detection of accidental lift(s), unclick(s), etc. Further, the motion detection component (310) can increase the defined sensitivity, e.g., decrease the magnitude of the unclick detection threshold, with respect to the detection of the unclick event in response to the rate of change of the movement being determined to satisfy the other defined condition representing the decrease in the speed—to facilitate increased detection of the unclick event when the stylus or the finger is moving less than or equal to the defined speed.

In embodiment(s), the rate detection component (410) can determine the rate of change of the movement as a combined "3D" velocity comprising: respective determinations of speed at which the finger or the stylus has moved across the tactile sensor (100) with respect to a first direction, e.g., with respect to an x-axis of a reference plane, and a second direction, e.g., with respect to a y-axis of the reference plane; and a determination of a rate of change of a force with respect to time, or speed of force change, in the first direction or the second direction.

In this regard, the motion detection component (310) can set, determine, etc. the click force threshold and/or the unclick force threshold as a continuous function of the speed at which the finger or the stylus has been determined to move across the tactile sensor, as a continuous function of the 3D velocity, etc.

In other embodiment(s), the motion detection component (310) can further be configured to modify the defined sensitivity with respect to detecting the click/unlick event based on a determined: force corresponding to the movement; area of a contact of the tactile sensor (100), e.g., location of display buttons, etc. corresponding to the movement; shape of the determined area of the contact; change in the determined force, e.g., over time; change in the determined area of the contact; change in the determined force relative to a determined change in position of the contact; time since a last click/unclick event has been detected; time since a last swipe of the tactile sensor (100) has occurred; hover path of a finger, stylus, etc.; motion of the finger, stylus, etc.; position of the finger, stylus, etc. on the tactile sensor (100); number of touches and/or contacts of the tactile sensor (100); gesture corresponding to the movement; location of the determined area of the contact; and/or probability of the click event that has been determined based on the determined force, the determined area of the contact, the determined shape, the determined change in the determined force, the determined change in the determined area of the contact, the determined time since the last click event has been detected, the determined time since the last swipe of the tactile sensor (100) has occurred, a distance from the last click/unclick, the determined hover path of the finger, stylus, etc., a drag state of the finger, stylus, etc., the determined motion of the finger, stylus, etc., the determined position of the finger, stylus, etc., the determined number of the touches of the tactile sensor (100), the determined number of the contacts of the tactile sensor (100), the determined gesture, and/or the determined location of the determined area of the contact.

In yet other embodiment(s), the prediction component (420) can be configured to determine a probability of an intentional click/unclick event based on a probabilistic model predicting a likelihood of an intentional click/unclick event based on the determined: force corresponding to the movement; area of a contact of the tactile sensor (100), e.g., location of display buttons, etc. corresponding to the movement; shape of the determined area of the contact; change in the determined force, e.g., over time; change in the determined area of the contact; change in the determined force relative to a determined change in position of the contact; time since a last click/unclick event has been detected; time since a last swipe of the tactile sensor (100) has occurred; hover path of a finger, stylus, etc.; motion of the finger, stylus, etc.; position of the finger, stylus, etc. on the tactile sensor (100); number of touches and/or contacts of the tactile sensor (100); gesture corresponding to the movement; location of the determined area of the contact; and/or probability of the click event that has been determined based on the determined force, the determined area of the contact, the determined shape, the determined change in the determined force, the determined change in the determined area of the contact, the determined time since the last click event has been detected, the determined time since the last swipe of the tactile sensor (100) has occurred, a distance from the last click/unclick, the determined hover path of the finger, stylus, etc., a drag state of the finger, stylus, etc., the determined motion of the finger, stylus, etc., the determined position of the finger, stylus, etc., the determined number of the touches of the tactile sensor (100), the determined number of the contacts of the tactile sensor (100), the determined gesture, and/or the determined location of the determined area of the contact.

Figure 6:
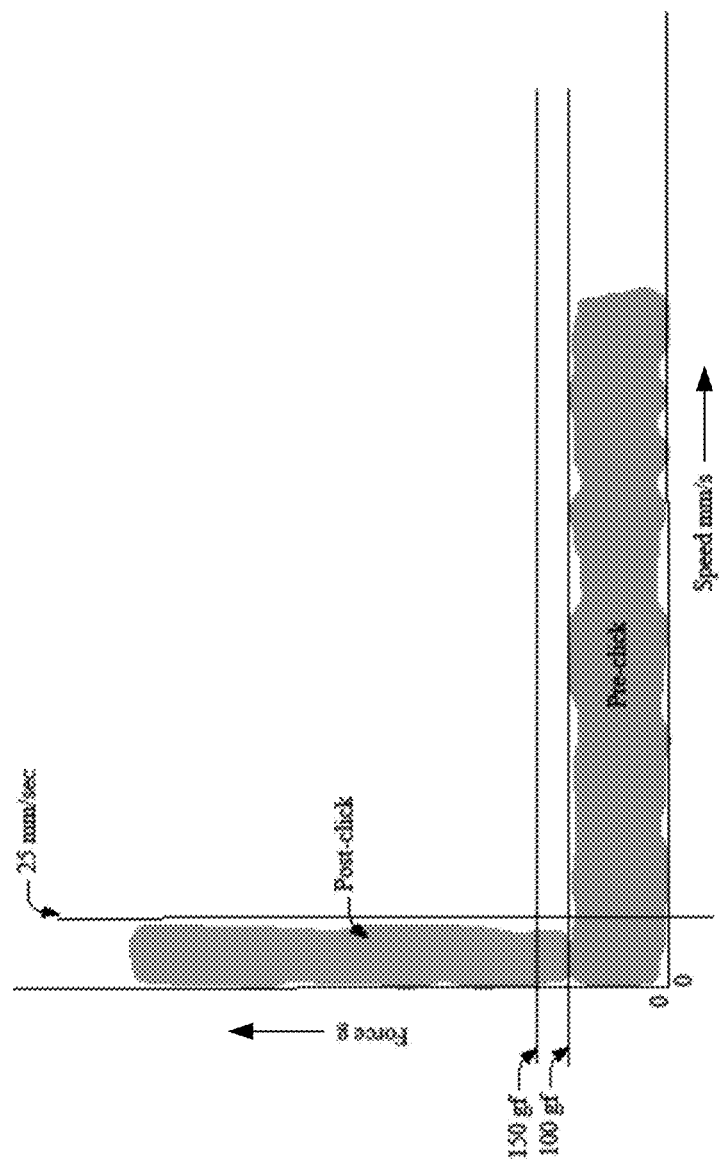
FIG. 6 illustrates empirical data of force of a movement of a finger on a pointing device vs. speed of the movement, in accordance with various example embodiments.
Figure 7:
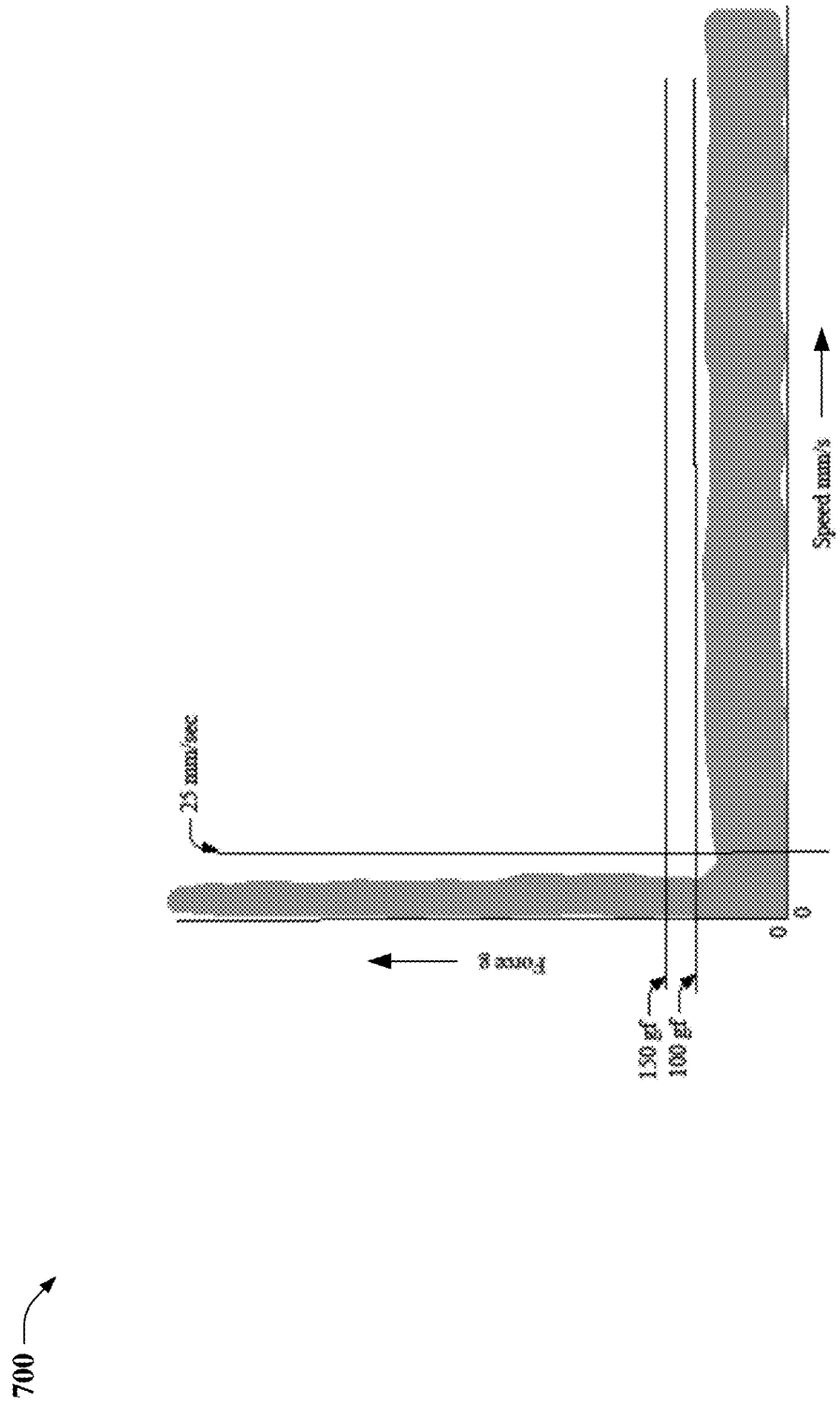
FIG. 7 illustrates other empirical data of force of the movement vs. speed of the movement, in accordance with various example embodiments.
Figure 8:
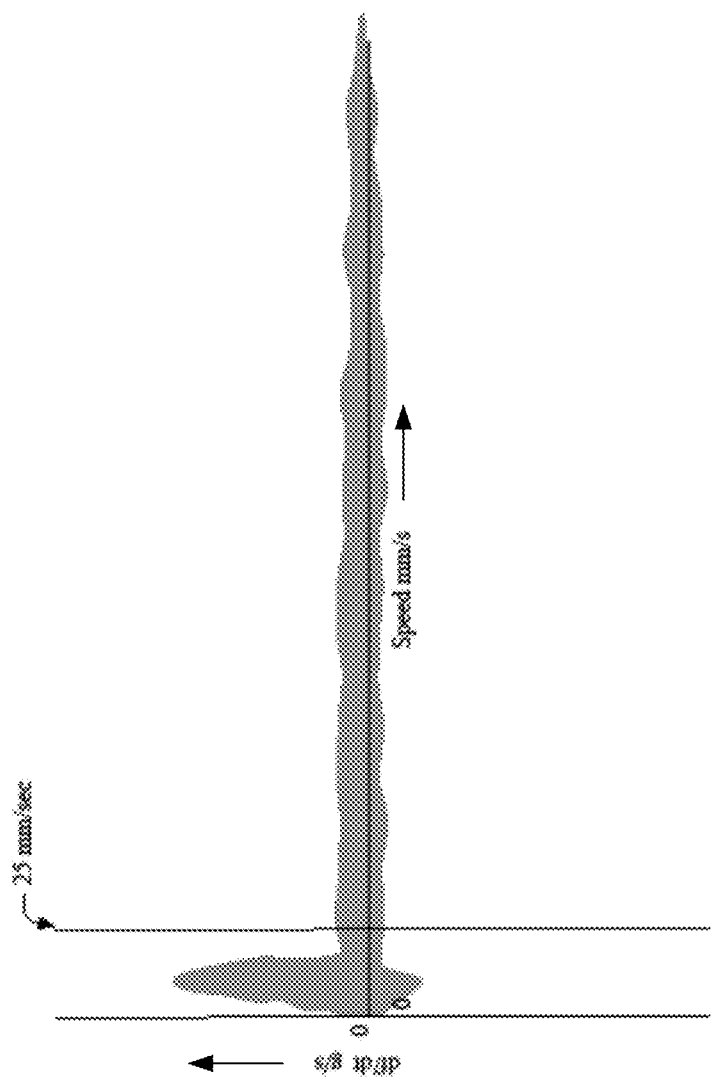
FIG. 8 illustrates empirical data of a rate of force of the movement vs. speed of the movement, in accordance with various example embodiments.

Referring now to FIGS. 6-8, empirical data of force of a movement of a finger on a pointing device vs. speed of the movement, and rate of force of the movement vs. speed of the movement are illustrated, respectively, in accordance with various example embodiments. FIG. 6 illustrates that most high forces occur under determined speeds of the movement of, e.g., 20 mm/sec to 30 mm/sec, and there is a gap between tracking and dragging movements. Further, FIG. 7 illustrates that most threshold crosses, e.g., indicating that a click has been determined to have occurred, occur under a determined speed of the movement of, e.g., 25 mm/sec. Furthermore, FIG. 8 illustrates that fast changes in force are strongly concentrated under a determined speed of the movement of, e.g., 25 mm/sec.

Based on such results, it can be appreciated by a person of ordinary skill in the art of touch sensor technology having the benefit of the instant disclosure that raising a click threshold of 110 grams-force by about 50%, e.g., to 150 grams-force, when a user's finger is determined to be moving faster than, e.g., 25 mm/sec would significantly reduce accidental clicks.

FIGS. 9-17 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
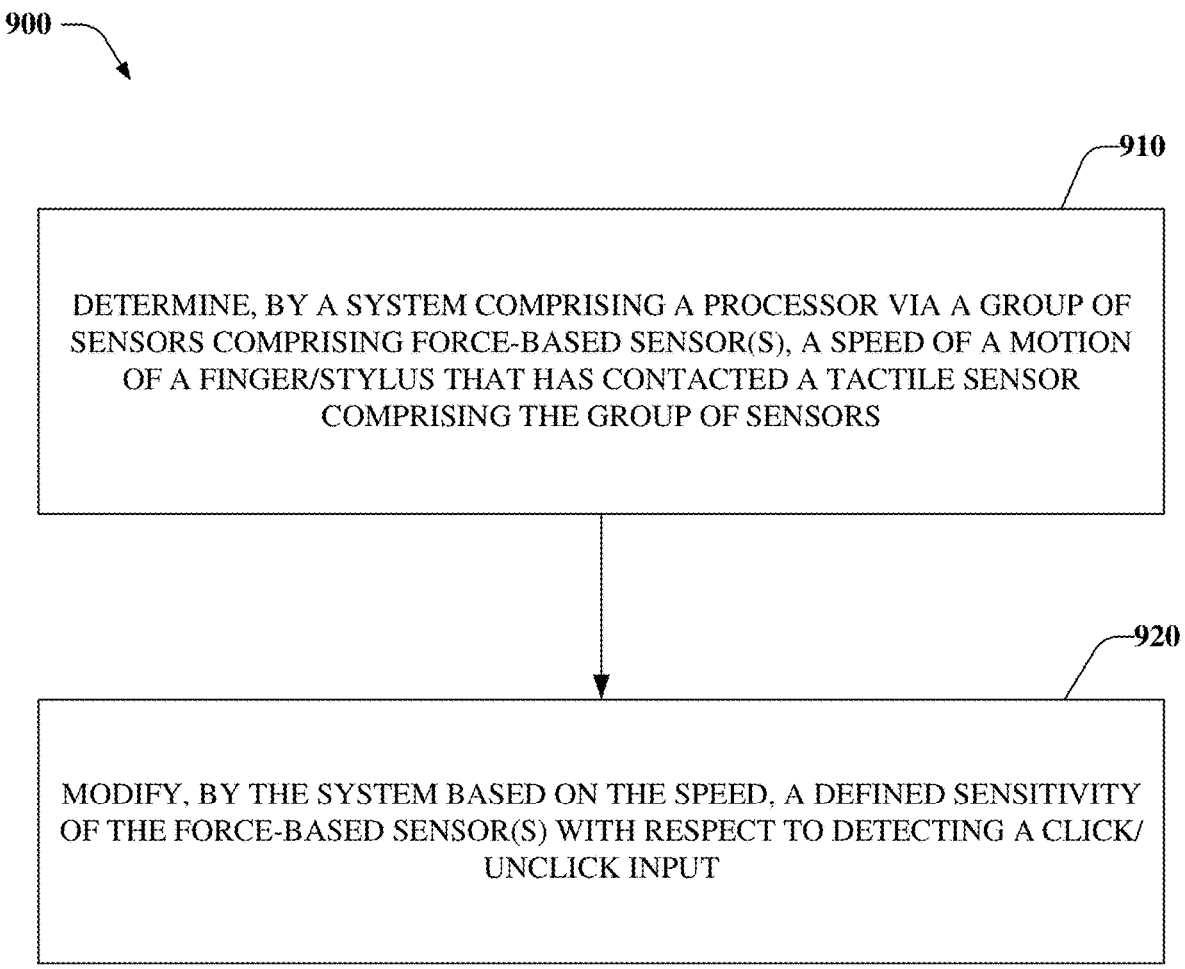
FIG. 9 illustrates a flowchart of a method associated with dynamically adjusting a click/unclick threshold of a tactile sensor based on a speed of motion of a finger/stylus that has contacted the tactile sensor, in accordance with various example embodiments.

Referring now to FIG. 9, a flowchart (900) of a method associated with dynamically adjusting a click/unclick threshold of a tactile sensor (100) based on a speed of motion of a finger/stylus that has contacted the tactile sensor is illustrated, in accordance with various example embodiments. At 910, a system (e.g., computing device 302) can determine, e.g., via a group of sensors comprising force-based sensor(s), a speed of a motion of a finger/stylus that has contacted a tactile sensor comprising the group of sensors. At 920, the system can modify, based on the speed, a defined sensitivity of the force-based sensor(s) with respect to detecting a click/unclick input, e.g., to facilitate a reduction in detection of accidental click/unclick inputs.

Figure 10:
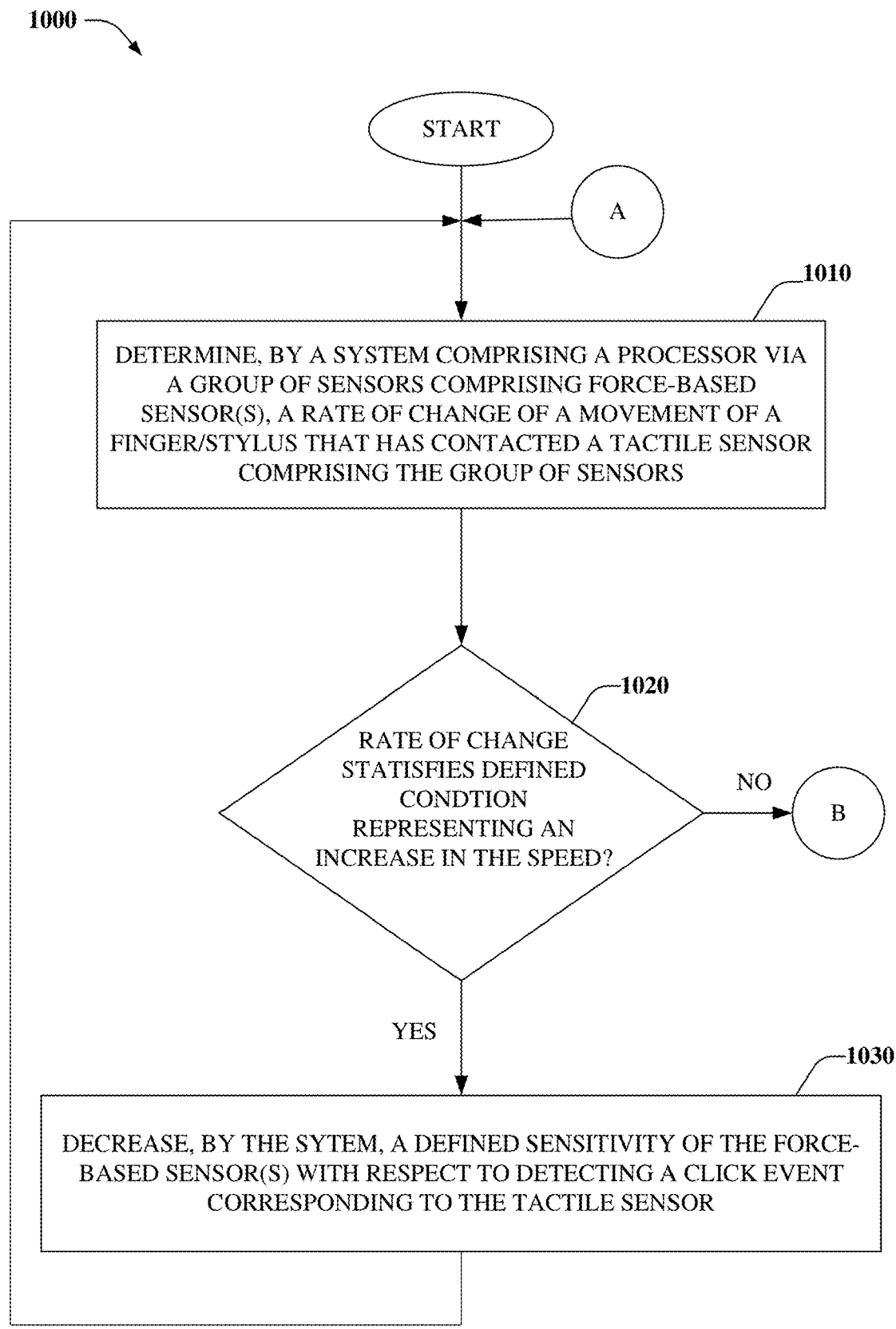
FIGS. 10-11 illustrate flowcharts of a method associated with dynamically adjusting a click threshold of a tactile sensor based on a speed of motion of a finger/stylus that has contacted the tactile sensor, in accordance with various example embodiments.
Figure 11:
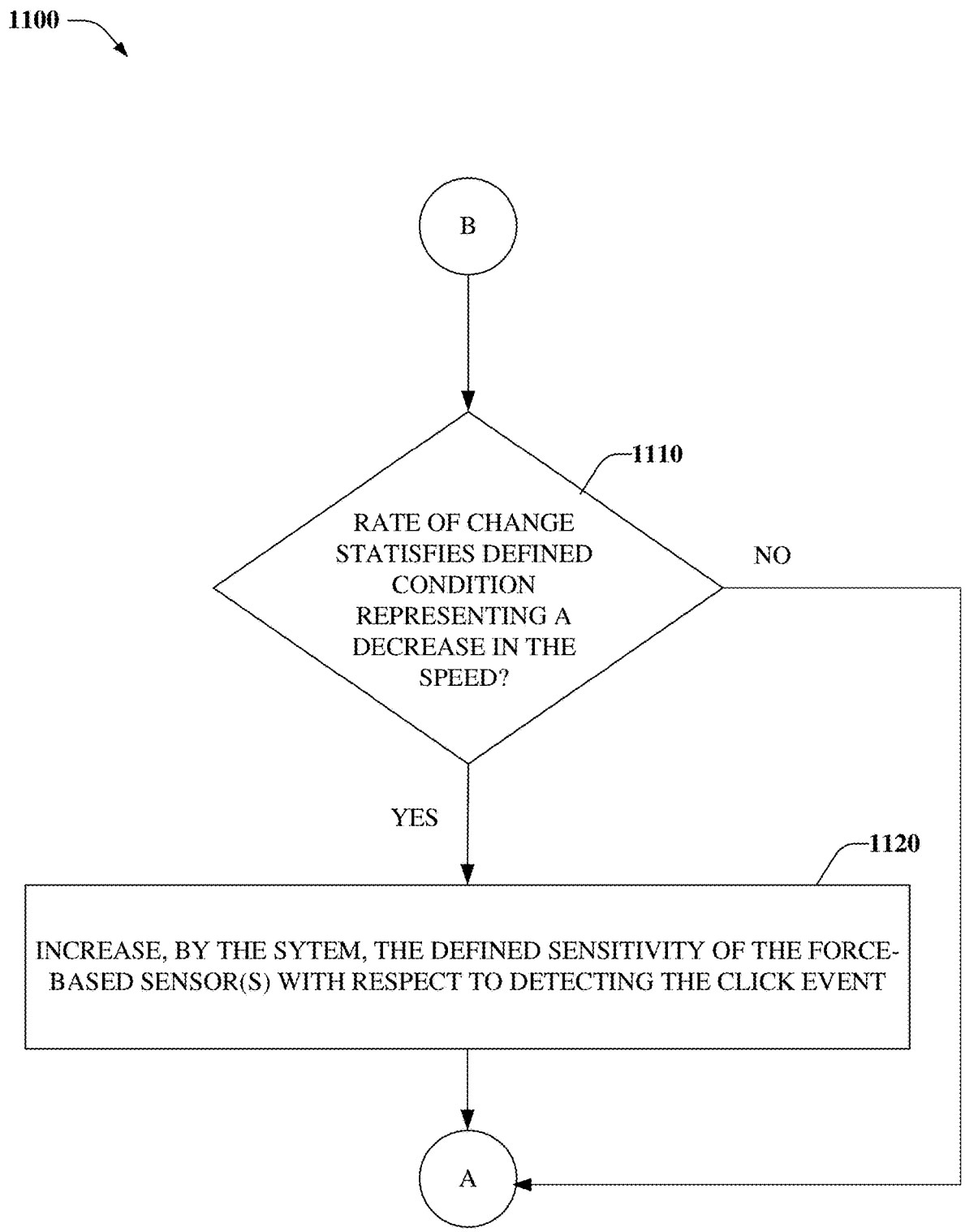

FIGS. 10-11 illustrate flowcharts (1000, 1100) of a method associated with dynamically adjusting a click threshold of a tactile sensor (100) based on a speed of motion of a finger/stylus that has contacted the tactile sensor, in accordance with various example embodiments. At 1010, a system (e.g., computing device 302) can determine, via a group of sensors comprising force-based sensor(s), a rate of change of a movement of a finger/stylus that has contacted a tactile sensor comprising the group of sensors. At 1020, the system can determine whether the rate of change satisfies a defined condition representing an increase in the speed, e.g., that the speed is greater than 25 mm/sec±5 mm/sec.

In this regard, if it is determined that the rate of change satisfies the defined condition representing the increase in the speed, flow continues to 1030, at which the system can decrease a defined sensitivity of the force-based sensor(s) with respect to detecting a click event; otherwise, flow continues to 1110, at which the system can determine whether the rate of change satisfies a defined condition representing a decrease in the speed, e.g., that the speed is less than 20 mm/sec.

At 1110, if it is determined that the rate of change satisfies the defined condition representing the decrease in the speed, flow continues to 1120, at which the system can increase the defined sensitivity of the force-based sensor(s) with respect to detecting the click event; otherwise, flow returns to 1010.

Figure 12:
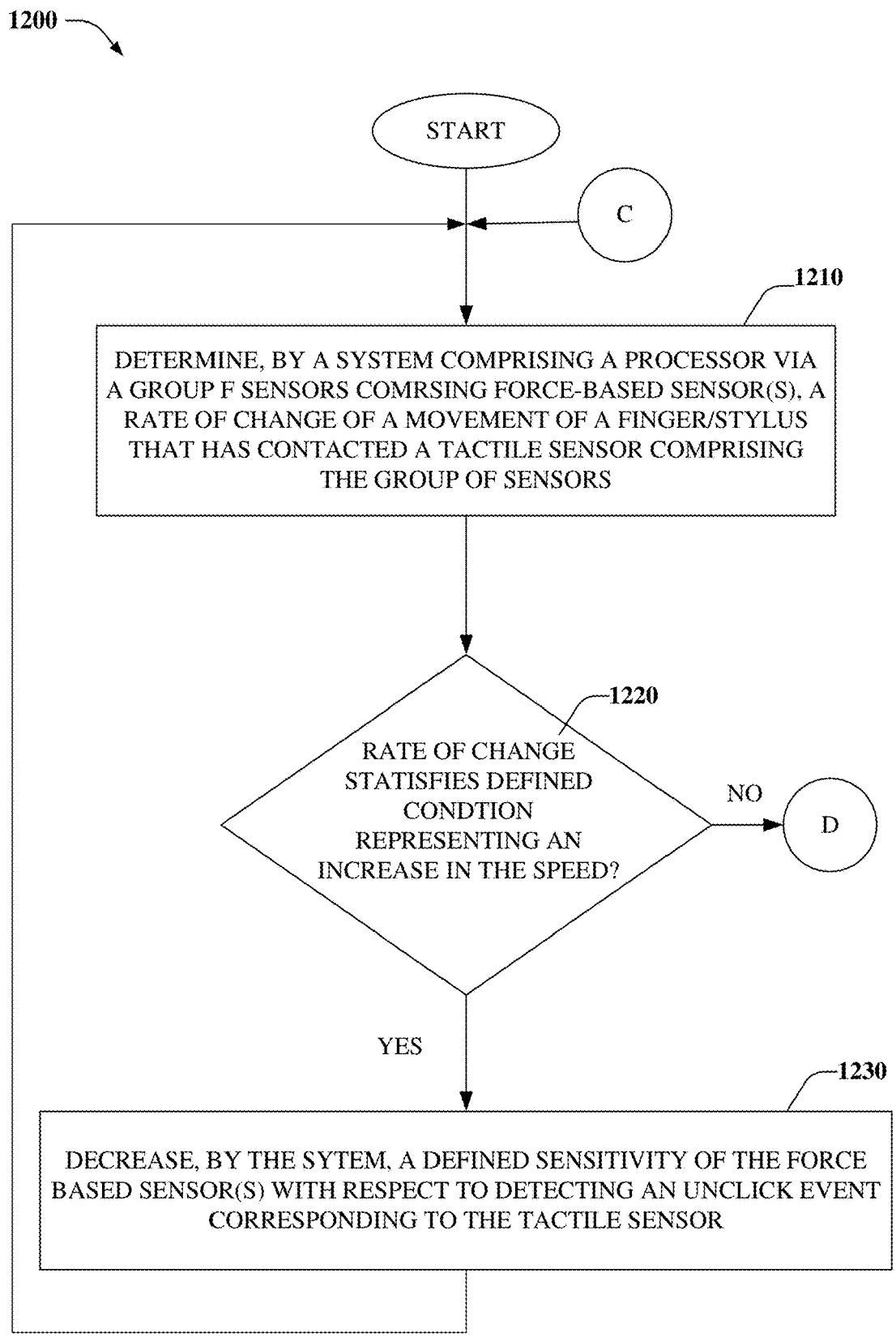
FIGS. 12-13 illustrate flowcharts of a method associated with dynamically adjusting an unclick threshold of a tactile sensor based on a speed of motion of a finger/stylus that has contacted the tactile sensor, in accordance with various example embodiments.
Figure 13:
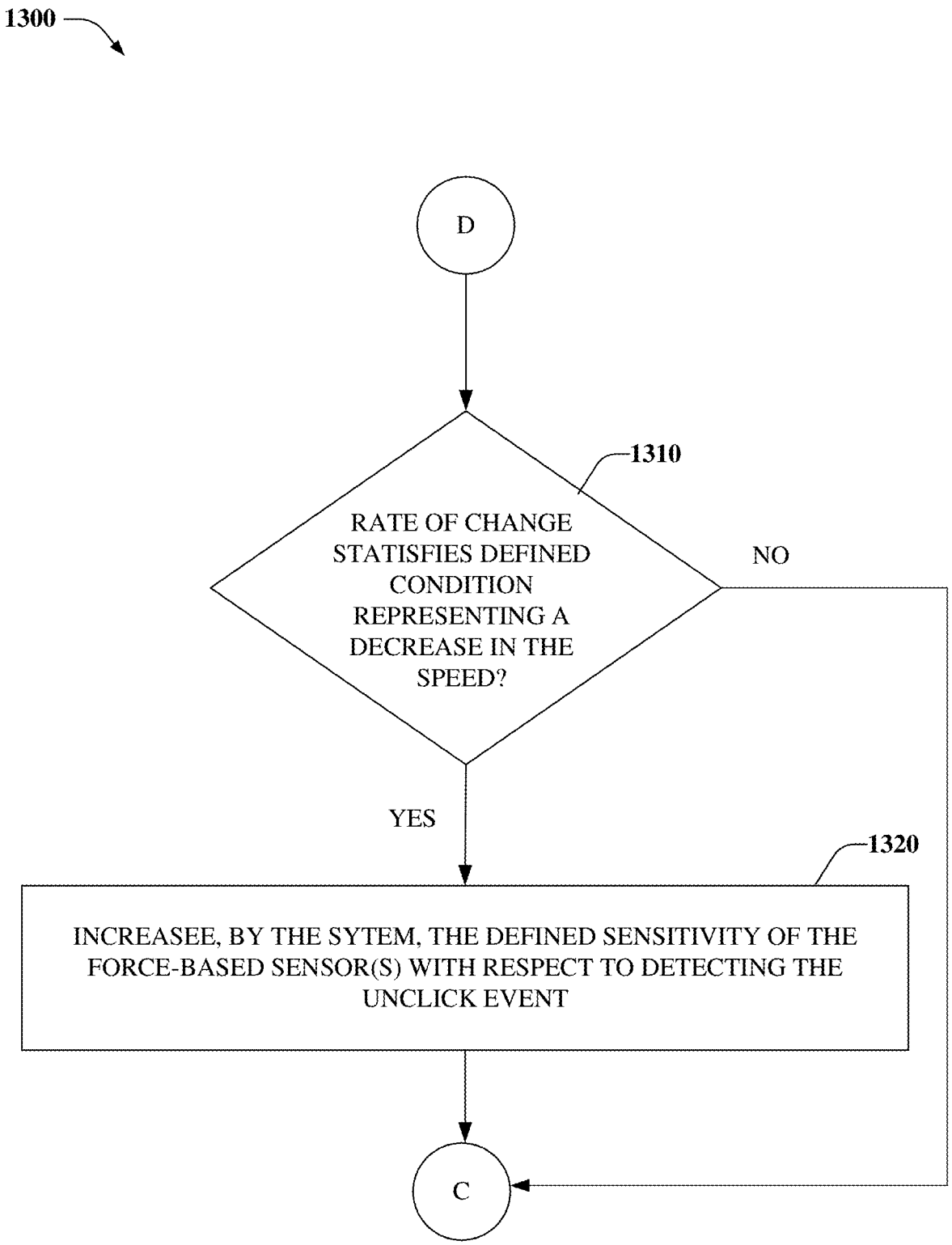
Figure 14:
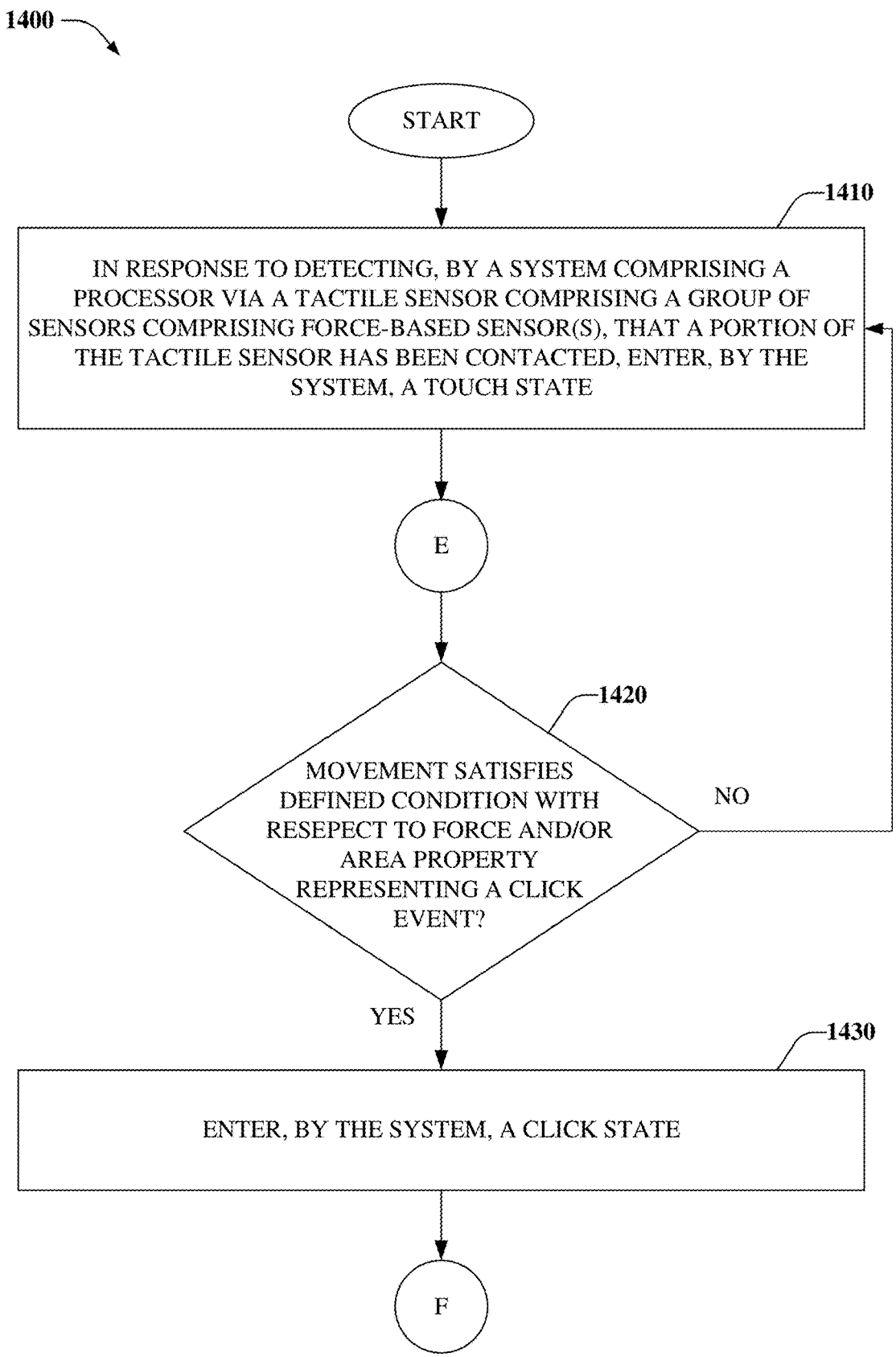
FIGS. 14-17 illustrate flowcharts of a method associated with a tactile sensor transitioning between click, drag, and unclick states, in accordance with various example embodiments.
Figure 15:
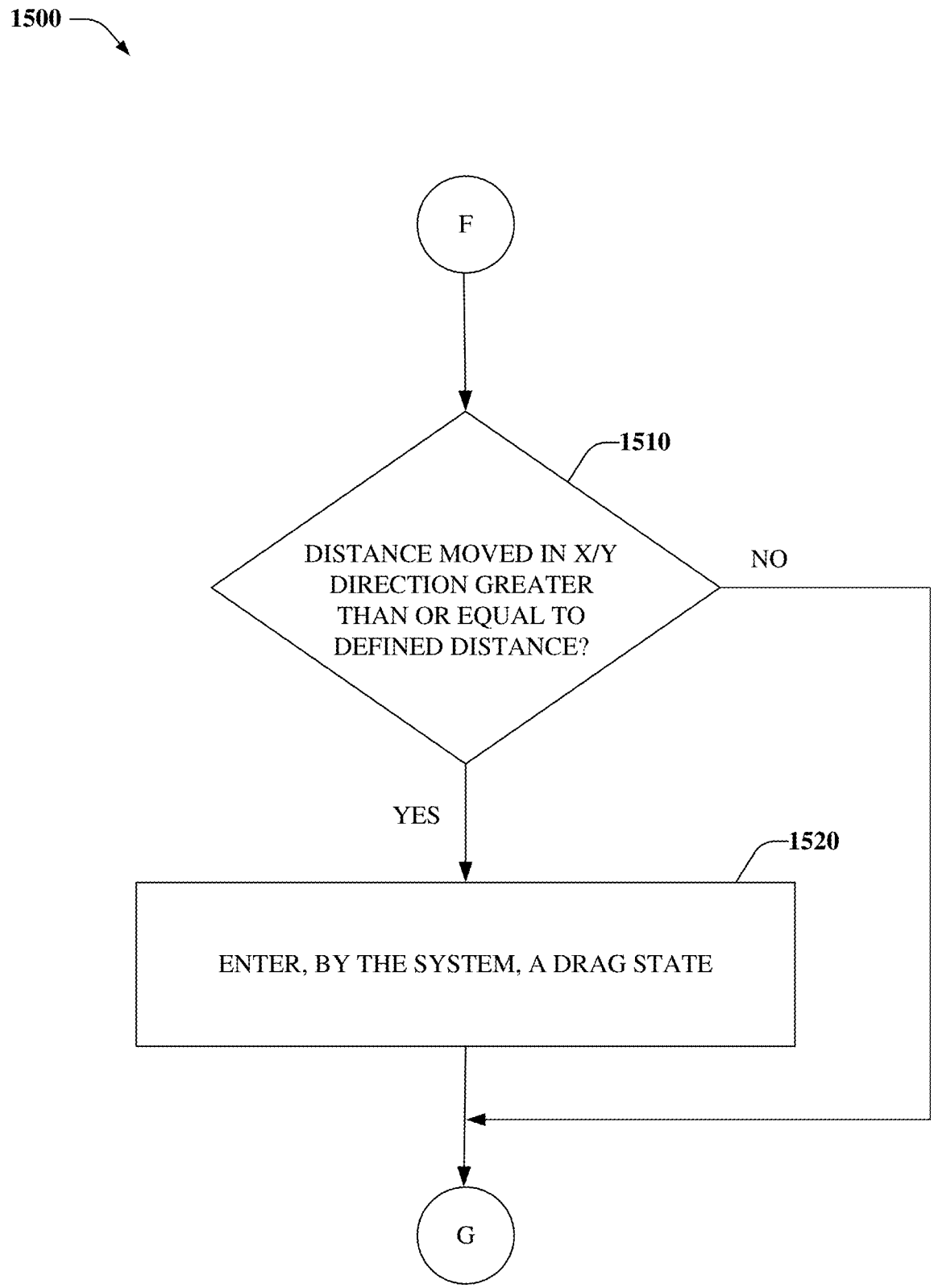
Figure 16:
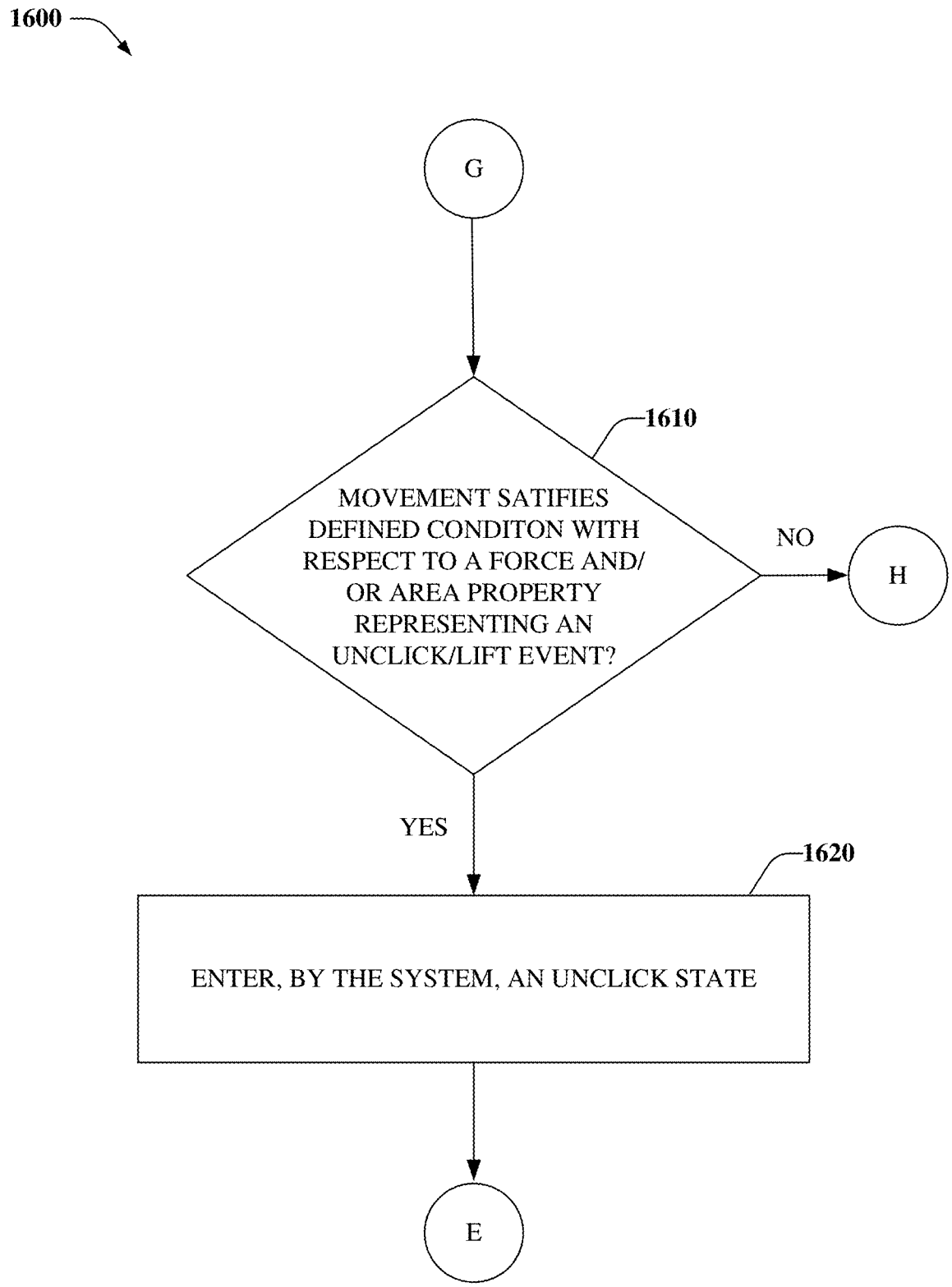
Figure 17:
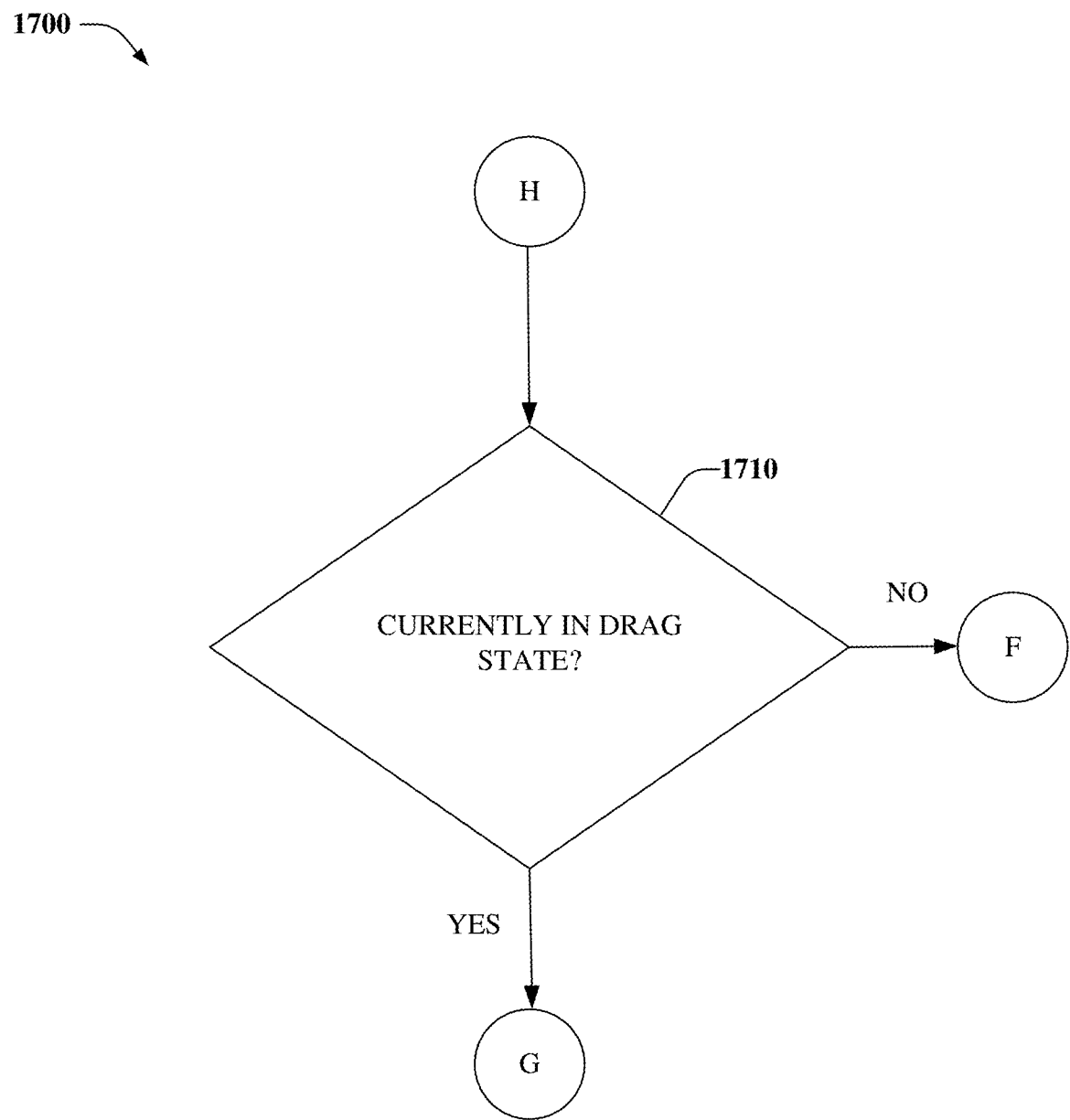

FIGS. 12-13 illustrate flowcharts (1200, 1300) of a method associated with dynamically adjusting an unclick threshold of a tactile sensor (100) based on a speed of motion of a finger/stylus that has contacted the tactile sensor, in accordance with various example embodiments.

At 1210, a system (e.g., comprising computing device 302) can determine, via a group of sensors comprising force-based sensor(s), a rate of change of a movement of a finger/stylus that has contacted a tactile sensor comprising the group of sensors. At 1220, the system can determine whether the rate of change satisfies a defined condition representing an increase in the speed, e.g., that the speed is greater than 25 mm/sec±5 mm/sec.

In this regard, if it is determined that the rate of change satisfies the defined condition representing the increase in the speed, flow continues to 1230, at which the system can decrease a defined sensitivity of the force-based sensor(s) with respect to detecting an unclick event; otherwise, flow continues to 1310, at which the system can determine whether the rate of change satisfies a defined condition representing a decrease in the speed, e.g., that the speed is less than 20 mm/sec.

At 1310, if it is determined that the rate of change satisfies the defined condition representing the decrease in the speed, flow continues to 1320, at which the system can increase the defined sensitivity of the force-based sensor(s) with respect to detecting the unclick event; otherwise, flow returns to 1210.

FIGS. 14-17 illustrate flow charts (1400, 1500, 1600, 1700) of a method associated with a tactile sensor transitioning between click, drag, and unclick states, in accordance with various example embodiments. At 1410, in response to detecting, by a system comprising a processor via a tactile sensor (100) comprising a group of sensors comprising force-based sensor(s), that a portion of the tactile sensor (100) has been contacted, touched, etc. by a finger or a stylus, the system (e.g., computing device 302) can enter a touch state (510).

In turn, the system (e.g., via the motion detection component (310)) can determine, at 1420, whether a movement of the finger or the stylus satisfies a defined condition with respect to a force property and/or an area property representing a click event, etc. (see, e.g., discussion related to FIG. 5 above). In this regard, in response to the movement of the finger or the stylus being determined to satisfy the defined condition representing the click event, flow continues to 1430, at which the system can enter a click state (520); otherwise flow returns to 1410.

Flow continues from 1430 to 1510, at which the system can determine (e.g., via the motion detection component (310)) whether the finger or the stylus is being moved, or dragged, across a surface of the tactile sensor (100) in an x/y direction at a distance that is greater than a defined distance, e.g., number of pixels.

In this regard, in response to the finger or the stylus being determined to be dragged across the surface of the tactile sensor (100) in the x/y direction greater than or equal to the defined distance, e.g., 1 pixel, the system can enter a drag state (530), and flow continues to 1610; otherwise the system remains in the click state (520) and flow continues to 1610.

At 1610, the system can determine whether the movement of the finger or the stylus satisfies a defined condition with respect to a force property and/or an area property representing an unclick event, etc. (see, e.g., discussion related to FIG. 5 above). In this regard, response to the movement of the finger or the stylus being determined to satisfy the defined condition representing the unclick event, flow continues to 1620, at which the system can enter the unclick state (540) and return to 1420; otherwise flow continues to 1710. At 1710, in response to a determination that the system is currently in the drag state (530), flow returns to 1610; otherwise flow returns to 1510.

As it employed in the subject specification, the terms "processor" and "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, the term "memory" and substantially any other information storage component relevant to operation and functionality of a system (e.g., 200), computing device 302, and/or components disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component, logic (e.g., control logic 240), etc. can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, the component, logic, etc. can be an apparatus that provides specific functionality through electronic components without mechanical parts; the electronic components can include one or more processors therein to execute software and/or firmware that confer(s), at least in part, the functionality of the electronic components.

Artificial intelligence-based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via prediction component 420, e.g., to determine a probability, determined likelihood, etc. of an intentional click/unclick event based on a probabilistic model predicting a likelihood of the intentional click/unclick event based on a determined: force corresponding to the movement; area of a contact of the tactile sensor (100), e.g., location of display buttons, etc. corresponding to the movement; shape of the determined area of the contact; change in the determined force, e.g., over time; change in the determined area of the contact; change in the determined force relative to a determined change in position of the contact; time since a last click/unclick event has been detected; time since a last swipe of the tactile sensor (100) has occurred; hover path of a finger, stylus, etc.; motion of the finger, stylus, etc.; position of the finger, stylus, etc. on the tactile sensor (100); number of touches and/or contacts of the tactile sensor (100); gesture corresponding to the movement; location of the determined area of the contact; and/or probability of the click event that has been determined based on the determined force, the determined area of the contact, the determined shape, the determined change in the determined force, the determined change in the determined area of the contact, the determined time since the last click event has been detected, the determined time since the last swipe of the tactile sensor (100) has occurred, a distance from the last click/unclick, the determined hover path of the finger, stylus, etc., a drag state of the finger, stylus, etc., the determined motion of the finger, stylus, etc., the determined position of the finger, stylus, etc., the determined number of the touches of the tactile sensor (100), the determined number of the contacts of the tactile sensor (100), the determined gesture, and/or the determined location of the determined area of the contact.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence-based systems, components, etc. can employ classifiers that are explicitly trained, e.g., via a generic training data, etc. as well as implicitly trained. For example, support vector machines can be configured via a learning or training phase within a classifier constructor and feature selection module, component, etc. Thus, the classifier(s) can be used by an artificial intelligence system to automatically learn and perform a number of functions, e.g., performed by the prediction component (420), the motion detection component (310), etc.

As used herein, the term "infer" or "inference" refers generally to the process of reasoning about, or inferring states of, the system, environment, user, and/or intent from a set of observations as captured via events and/or data. Captured data and events can include device data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of components, logic, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a tactile sensor comprising one or more force-based sensors; and
   a motion detection component that is configured to
      determine a rate of change of a movement that has been detected via a group of sensors comprising the one or more force-based sensors, and
      in response to the rate of change of the movement being determined to satisfy a first defined condition representing an increase in a speed at which a stylus or a finger has moved across the tactile sensor, decrease a defined sensitivity of the one or more force-based sensors with respect to detection of at least one of a click event corresponding to the tactile sensor or an unclick event corresponding to the tactile sensor, wherein the click event or the unclick event represents the movement being determined to satisfy the first defined condition with respect to at least a force property of the movement that is represented by at least a defined velocity of a force that has been determined to be applied to the one or more force-based sensors.

2. The system of claim 1, wherein the one or more force-based sensors comprise a variable impedance array comprising variable impedance elements that interconnect with respective row and column cross points of the variable impedance array.

3. The system of claim 1, wherein the tactile sensor comprises capacitive sensors to facilitate a determination of the rate of change of the movement.

4. The system of claim 1, wherein the tactile sensor comprises optical sensors to facilitate a determination of the rate of change of the movement.

5. The system of claim 1, wherein the movement represents the one or more force-based sensors being contacted by the stylus or the finger.

6. The system of claim 5, wherein the click event or the unclick event represents the movement being determined to satisfy the first defined condition with respect to at least an area property of the movement.

7. The system of claim 6, wherein the first defined condition with respect to the area property is represented by a defined gesture recognition score of a gesture that has been determined to have been detected.

8. The system of claim 6, wherein the first defined condition with respect to the area property is represented by at least one of:
- a defined percentage of area of the tactile sensor that has been determined to be contacted by the finger; or
- a defined location of the tactile sensor that has been determined to be contacted by the finger.

9. The system of claim 1, wherein the first defined condition with respect to the force property is represented by at least
- a defined magnitude of the force.

10. The system of claim 1, wherein the motion detection component is further configured to:
- in response to the rate of change of the movement being determined to satisfy a second defined condition representing a decrease in the speed, increase the defined sensitivity with respect to the detection of the click event.

11. The system of claim 1, wherein the motion detection component is further configured to:
- in response to the rate of change of the movement being determined to satisfy a second defined condition representing a decrease in the speed, increase the defined sensitivity with respect to the detection of the unclick event.

12. The system of claim 1, wherein the force is a determined force, and wherein the motion detection component is further configured to modify the defined sensitivity based on at least one of a determined:
- area of a contact of the tactile sensor corresponding to the movement;
- shape of the determined area of the contact;
- change in the determined force;
- change in the determined area of the contact;
- change in the determined force relative to a determined change in position of the contact;
- time since a last click event has been detected;
- time since a last swipe of the tactile sensor has occurred;
- hover path of the finger or the stylus;
- motion of the finger or the stylus;
- position of the finger or the stylus on the tactile sensor;
- number of at least one of touches of the tactile sensor or contacts comprising the contact of the tactile sensor;
- gesture corresponding to the movement;
- location of the determined area of the contact; or
- probability of the click event based on at least one of the determined force, the determined area of the contact, the determined shape, the determined change in the determined force, the determined change in the determined area of the contact, the determined time since the last click event has been detected, the determined time since the last swipe of the tactile sensor has occurred, a distance from the last click, the determined hover path of the finger or the stylus, a drag state of the finger or the stylus, the determined motion of the finger or the stylus, the determined position of the finger or the stylus, the determined number of the touches of the tactile sensor, the determined number of the contacts of the tactile sensor, the determined gesture, or the determined location of the determined area of the contact.

13. A method, comprising:
- determining, by a system comprising a processor via a group of sensors comprising at least one force-based sensor, a speed of a motion of at least one of a finger or a stylus that has contacted a tactile sensor comprising the group of sensors; and
- in response to an increase in the speed of the motion being detected, decreasing, by the system, a defined sensitivity of the at least one force-based sensor with respect to detecting at least one of a click input or an unclick input, wherein the click input or the unclick input represents the motion being determined to satisfy a defined condition with respect to a force property of the motion that is represented by a defined velocity of a force that has been determined to be applied to the at least one force-based sensor.

14. The method of claim 13, wherein the decreasing further comprises:
- decreasing the defined sensitivity of the at least one force-based sensor with respect to detecting the click input to facilitate a reduction in detection of accidental click inputs.

15. The method of claim 13, wherein the operations further comprise:
- in response to determining that the speed of the motion has decreased, increasing, by the system, the defined sensitivity of the at least one force-based sensor with respect to detecting the click input to facilitate an increase in detection of click inputs comprising the click input.

16. The method of claim 13, wherein the decreasing further comprises:
- decreasing the defined sensitivity of the at least one force-based sensor with respect to detecting the unclick input to facilitate a reduction in detection of accidental lifts of the finger or the stylus from the tactile sensor.

17. The method of claim 13, wherein the operations further comprise:
- in response to determining that the speed of the motion has decreased, increasing, by the system, the defined sensitivity of the at least one force-based sensor with respect to detecting the unclick input to facilitate an increase in detection of lifts of the finger or the stylus from the tactile sensor.

18. A device, comprising:
- a group of sensors comprising a force-based sensor; and
- a motion detection component that
  - determines, using at least a portion of the group of sensors, a speed of a motion of at least one of a finger or a stylus that has contacted the portion of the group of sensors, and
  - based on the speed of the motion being determined to increase, decreases a defined sensitivity of the force-based sensor with respect to detection of a click input or an unclick input, wherein the click input or the unclick input represents the motion being determined to satisfy a defined condition with respect to a force property of the motion that is represented by a defined velocity of a force that has been determined to be applied to the portion of the group of sensors.

19. The device of claim 18, wherein the motion detection component detects the click input or the unclick input based on at least one of:
- a defined magnitude of the force that has been determined to be applied to the portion of the group of sensors;
- a defined gesture recognition score of a gesture that has been determined to have been detected;
- a defined percentage of area of the portion of the group of sensors that has been determined to be contacted by a finger; or
- a defined location of the portion of the group of sensors that has been determined to be contacted by the finger.

20. The device of claim 18, wherein the motion detection component is further configured to:
  based on the speed of motion being determined to decrease, increase the defined sensitivity with respect to the detection of the click input or the unclick input.

* * * * *